(12) United States Patent
Kotnis et al.

(10) Patent No.: US 12,025,223 B1
(45) Date of Patent: Jul. 2, 2024

(54) TWO STAGE REDUCTION GEARBOX WITH MULTIPLE NON SELECTABLE RATIOS FOR THREE WHEELER EV APPLICATIONS

(71) Applicant: Dana Automotive Systems Group, LLC, Maumee, OH (US)

(72) Inventors: Yashodhan Kotnis, Pune (IN); Durganand Kulkarni, Pune (IN)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 19 days.

(21) Appl. No.: 18/146,263

(22) Filed: Dec. 23, 2022

(51) Int. Cl.
*F16H 9/16* (2006.01)

(52) U.S. Cl.
CPC ......... *F16H 9/16* (2013.01); *F16H 2009/163* (2013.01)

(58) Field of Classification Search
CPC .... F16H 9/16; F16H 2009/163; F16H 37/082; F16H 37/08
USPC .......................................................... 474/35
See application file for complete search history.

(56) References Cited

U.S. PATENT DOCUMENTS

| | | | | |
|---|---|---|---|---|
| 6,421,903 B2 * | 7/2002 | Brown | ................... | F16H 55/56 474/18 |
| 7,237,638 B2 * | 7/2007 | Ishikawa | ................... | F16H 9/18 74/606 R |
| 7,717,815 B2 * | 5/2010 | Tenberge | .............. | F16H 37/084 475/5 |
| 11,305,636 B1 * | 4/2022 | Cho | ........................ | B60K 6/442 |
| 2015/0226296 A1 * | 8/2015 | Gassmann | ................ | F16H 3/56 475/150 |
| 2020/0116215 A1 * | 4/2020 | Satoh | ....................... | F16D 41/04 |
| 2021/0010415 A1 * | 1/2021 | Lister | ......................... | F16H 1/20 |
| 2022/0203827 A1 * | 6/2022 | Engerman | ........... | F16H 63/3416 |
| 2022/0355657 A1 * | 11/2022 | Kawamoto | ............ | B60K 17/08 |

FOREIGN PATENT DOCUMENTS

| | | | | |
|---|---|---|---|---|
| CN | 111059243 A | * | 4/2020 | ............. F16H 37/08 |
| KR | 101474936 B1 | * | 12/2014 | |
| WO | WO-2020259876 A1 | * | 12/2020 | ............... B60K 1/00 |

\* cited by examiner

*Primary Examiner* — Gene O Crawford
*Assistant Examiner* — Emily R Kincaid
(74) *Attorney, Agent, or Firm* — McCoy Russell LLP

(57) ABSTRACT

A line of transmissions is described having a first multi-stage reduction gearbox that includes a first stage (first reduction set) having a variable ratio belt drive with a first fixed ratio, and a second stage (second reduction set) having fixed gears; and a second multi-stage reduction gearbox including a first stage having the same variable ratio belt drive as the first multi-stage reduction gearbox but with a second fixed ratio different from the first, and a second stage having the same fixed gears as the second stage of the first multi-stage reduction gearbox.

19 Claims, 11 Drawing Sheets

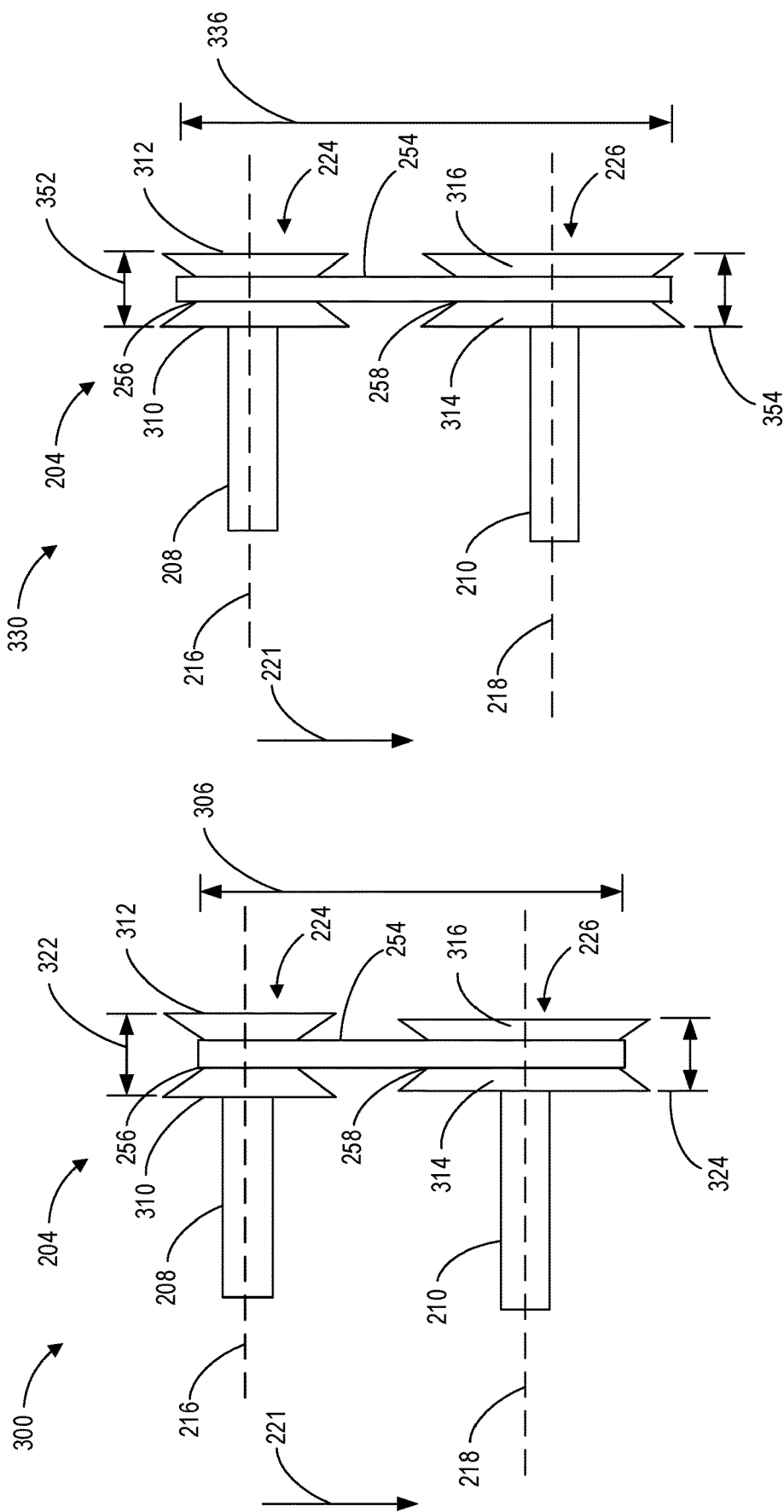

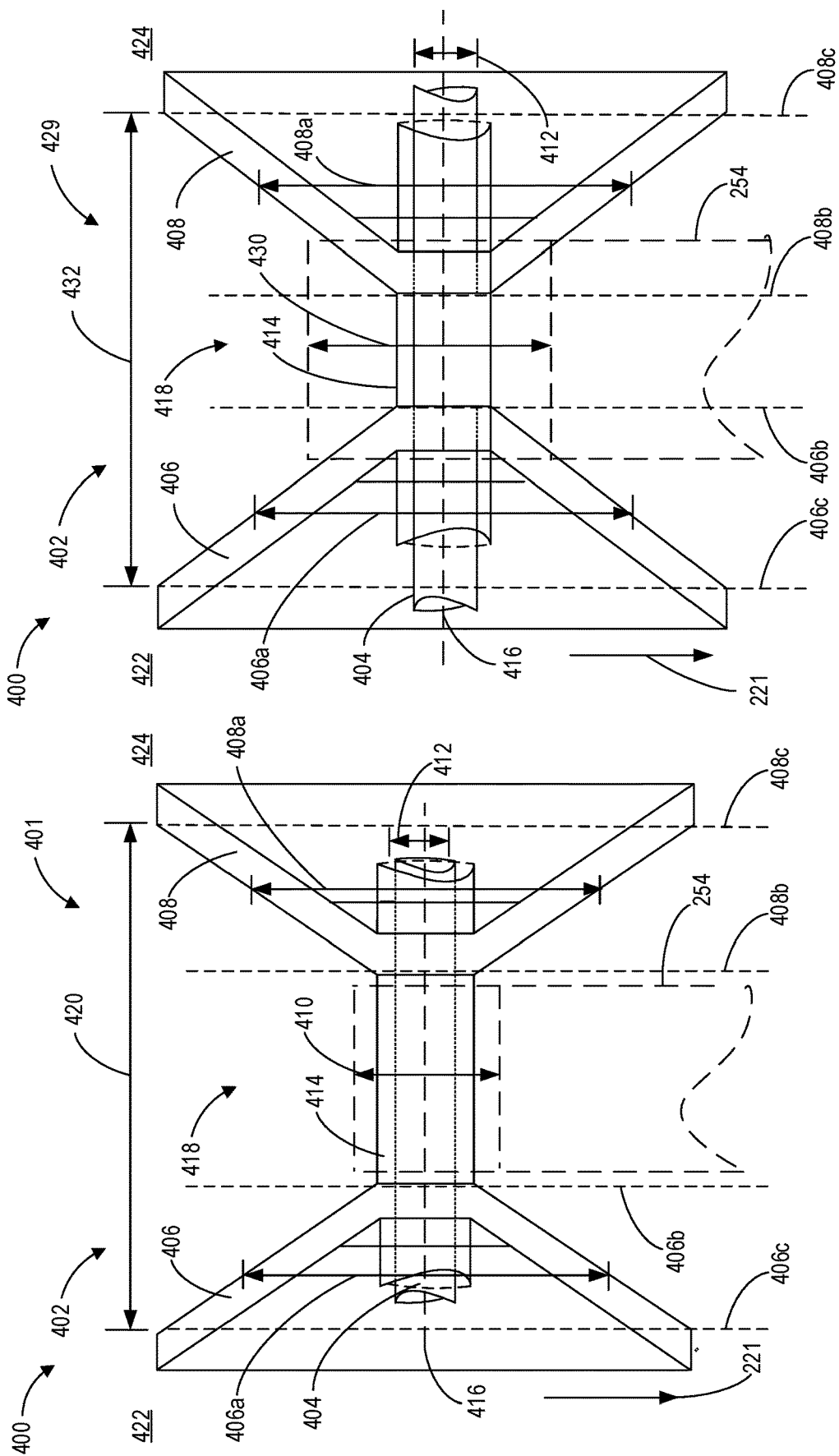

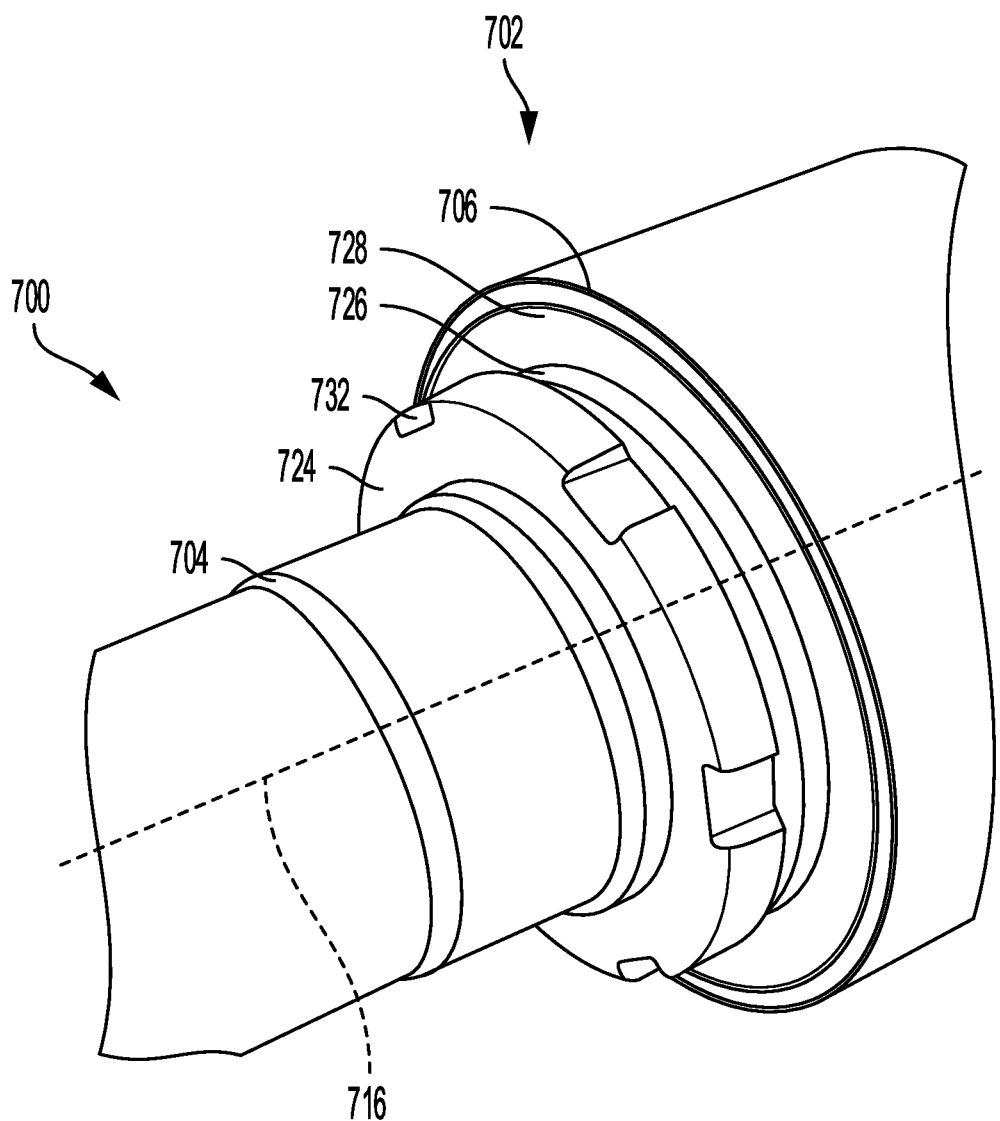
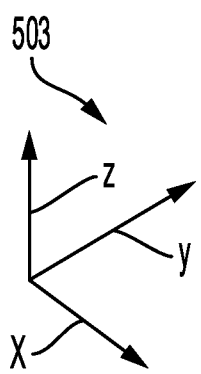
FIG. 7

TWO STAGE REDUCTION GEARBOX WITH MULTIPLE NON SELECTABLE RATIOS FOR THREE WHEELER EV APPLICATIONS

TECHNICAL FIELD

The present description relates generally to a transmission using a gearbox with a variable belt drive with components that may be used interchangeably for a plurality of sizes of gear ratio.

BACKGROUND AND SUMMARY

Vehicles, such as highway vehicles or off-highway vehicles, may have a transmission with a gearbox. The gearbox may contain a gear assembly with a plurality of reduction sets (ratios). Different vehicle applications may use similar sized gearboxes and yet require slightly different gear ratios depending on vehicle parameters. For example, parameters that may influence an appropriate gear ratio for a vehicle may include vehicle weight, prime mover specifications, tire size, gradeability targets, and speed targets.

For vehicles having gearboxes of similar size and dimension, the ratio requirement for a reduction set may vary over a considerable range (e.g., from 10.5 to 13.0). For one of such vehicles, the appropriate gear ratio for the gearbox may be specific to the vehicle parameters. To design a gearbox for one of such vehicles having dissimilar vehicle parameters, an alternate gear ratio may be developed and validated. For example, new gearsets with appropriate teeth count may be manufactured to achieve the appropriate ratio.

The inventors herein have recognized potential issues with the above approach. For example, developing new gearsets demands investment in significant amount of tooling (e.g., hobs, gear grinding wheels, shaving cutters, etc.). Additionally, there may be a substantial amount of waste material generated and additional materials used at all levels. In emerging markets, manufacturing may be more difficult due to scarcity or lack of variety in materials and equipment.

In an example, the issues described above may be addressed by a line of transmissions, comprising: a first multi-stage reduction gearbox that includes a first stage having a variable ratio belt drive with a first fixed ratio, and a second stage having fixed gears; and a second multi-stage reduction gearbox including a first stage having the same variable ratio belt drive as the first multi-stage reduction gearbox but with a second fixed ratio different from the first, and a second stage having the same fixed gears as the second stage of the first multi-stage reduction gearbox.

In this way, it is possible to provide a range of ratios using a common set of transmission hardware thus providing a flexible gearbox solution that supports a variety of vehicle applications and stakeholders.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows schematically the belt drive in FIGS. 2A-B with components in a first position;

FIG. 3B shows schematically the belt drive in FIG. 3A with components in a second position;

FIG. 4A shows schematically a pulley in a first position;

FIG. 4B shows schematically a pulley in a second position;

FIG. 7 shows an example of an embodiment of the pulley from FIG. 4D from an isometric view;

DETAILED DESCRIPTION

The description relates to a belt drive incorporated into a gear assembly of a multi-stage reduction gearbox and/or transmission. The belt drive may be used in a vehicle having a three-wheel configuration, such as a rickshaw or a tricycle, or a four-wheel configuration, such as a motorized cart, car, or truck. The vehicle has a prime mover that may be electrically or combustion driven. The belt drive may be used as a reduction stage, for example, functioning similar to and replacing a gear reduction stage in a gear assembly. The belt drive is physically capable of having different ratios. When assembled in a transmission, the belt drive is fixed at a position that gives only a single fixed gear ratio. In a second transmission, using the same hardware, the belt drive can be fixed in a different position that gives a different ratio.

The belt drive may be formed of at least two pulleys with a driving pulley and a driven pulley. Each pulley of the belt drive may be located about and supported by a shaft. The driving pulley may be located about and drivingly coupled to a shaft in the form of an input shaft. The driven pulley may be located about and drivingly coupled to an output shaft. The output shaft of the driven pulley may act as intermediate shaft for the assembly of gears and other reduction stages. The input shaft may deliver mechanical energy via a torque to spin the driving pulley about an axis. The input shaft may be drivingly coupled to a source or an output of a source of mechanical power that may supply the input shaft and driving pulley with torque. The driving pulley may transfer torque to the driven pulley via the belt of the belt drive. The driven pulley may transfer torque to the output shaft. The ratio formed between the driving pulley and driven pulley may increase the torque and reduce the rotations per minute (RPM) in the output shaft compared to the input shaft.

Typically, if the ratio of the gearset is changed, the gears are replaced or machined to account for the difference in diameter and features, such as teeth, determined for the new ratio. In the present application, the pulleys of the belt drive may be adjusted without replacing or machining the majority of components that form the gearbox. The pulleys of the belt drive may be adjustable in that the effective torque transmitting diameters of the pulleys may be manually changed during the manufacture of the belt drive. When the effective torque transmitting diameter of a single pulley or the effective torque transmitting diameters of a plurality of the pulleys are increased, the ratio of the belt drive may be increased. When the effective torque transmitting diameter of a single pulley or the effective torque transmitting diameters of a plurality of the pulleys are decreased, the ratio of the belt drive may be decreased.

Figure 1A:
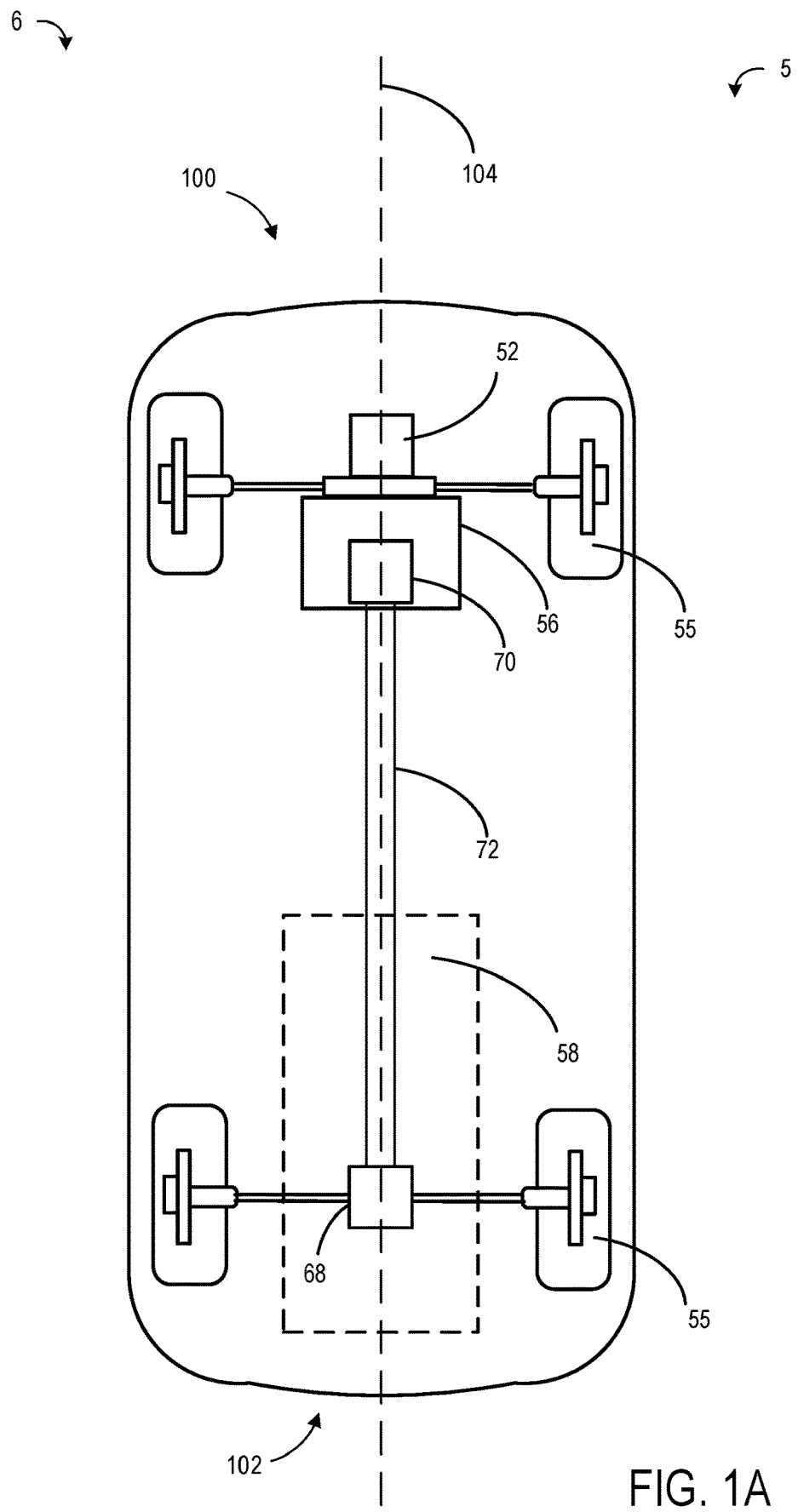
FIG. 1A shows schematically a vehicle of a first embodiment with a transmission and other components and features of or affected by a driveline system.
Figure 1B:
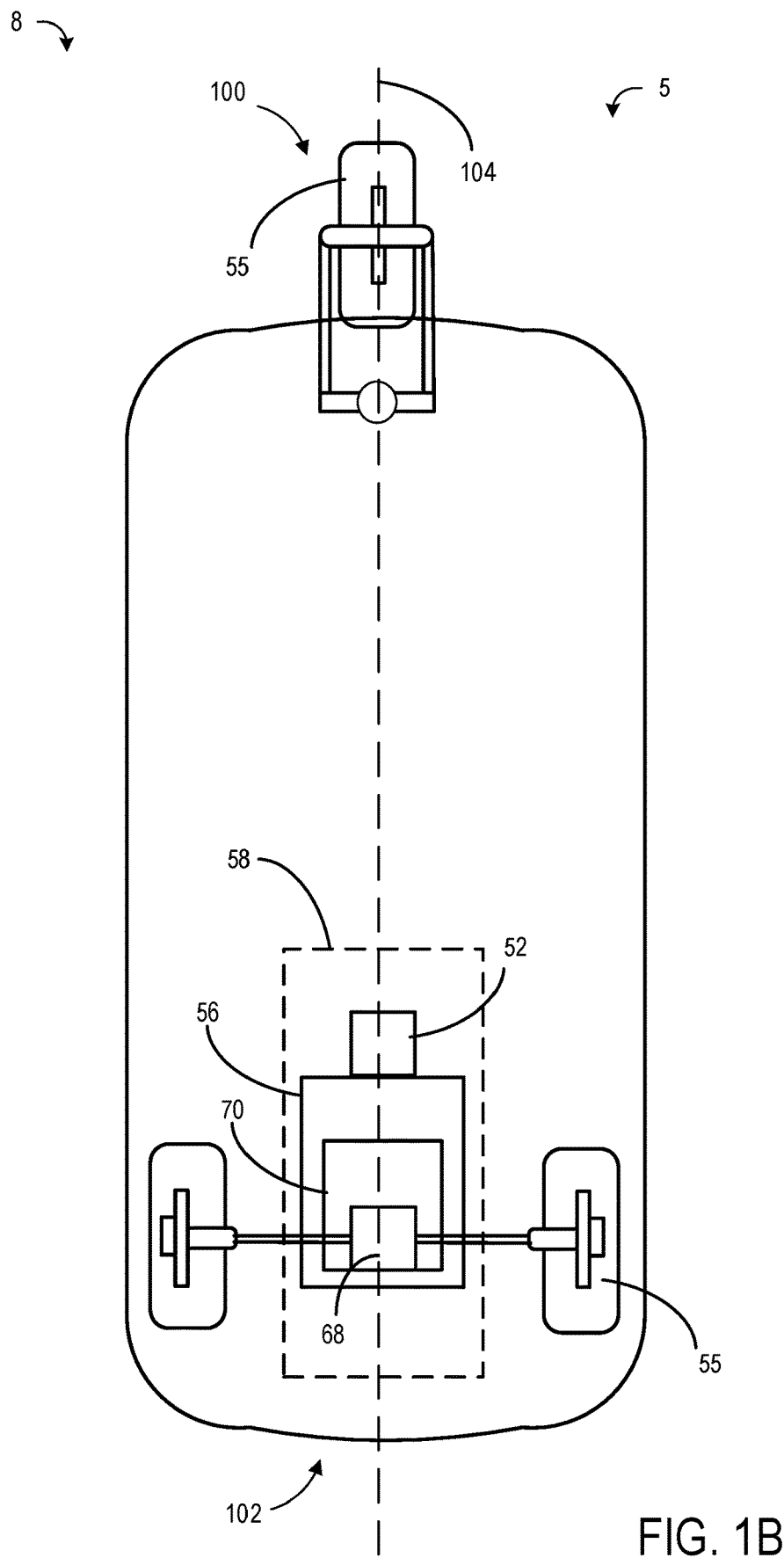
FIG. 1B shows schematically a vehicle of a second embodiment with a transmission and other components and features of or affected by a driveline system.
Figure 2A:
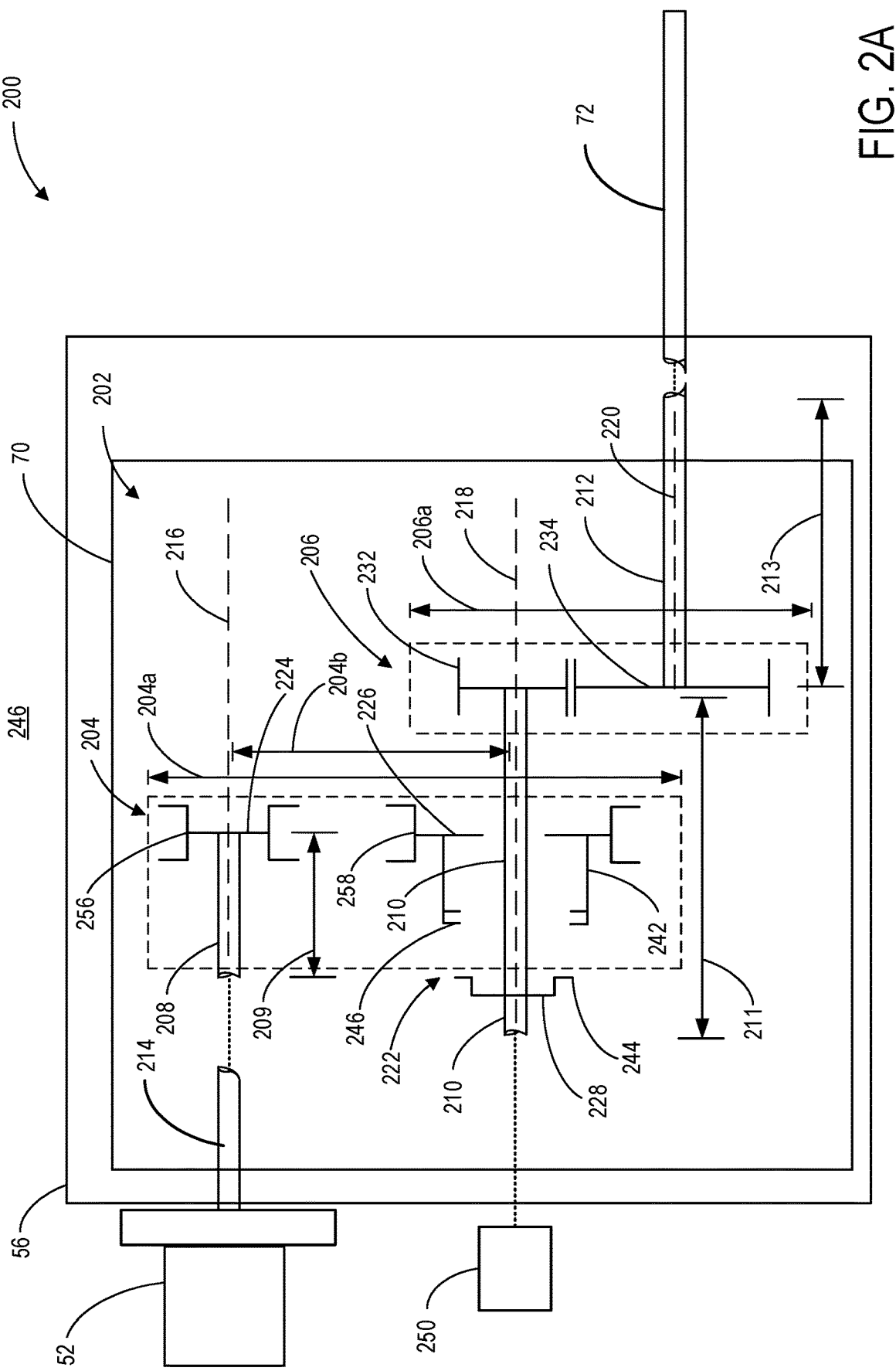
FIG. 2A shows schematically the transmission and gearbox with a gear assembly incorporating a belt drive.
Figure 2B:
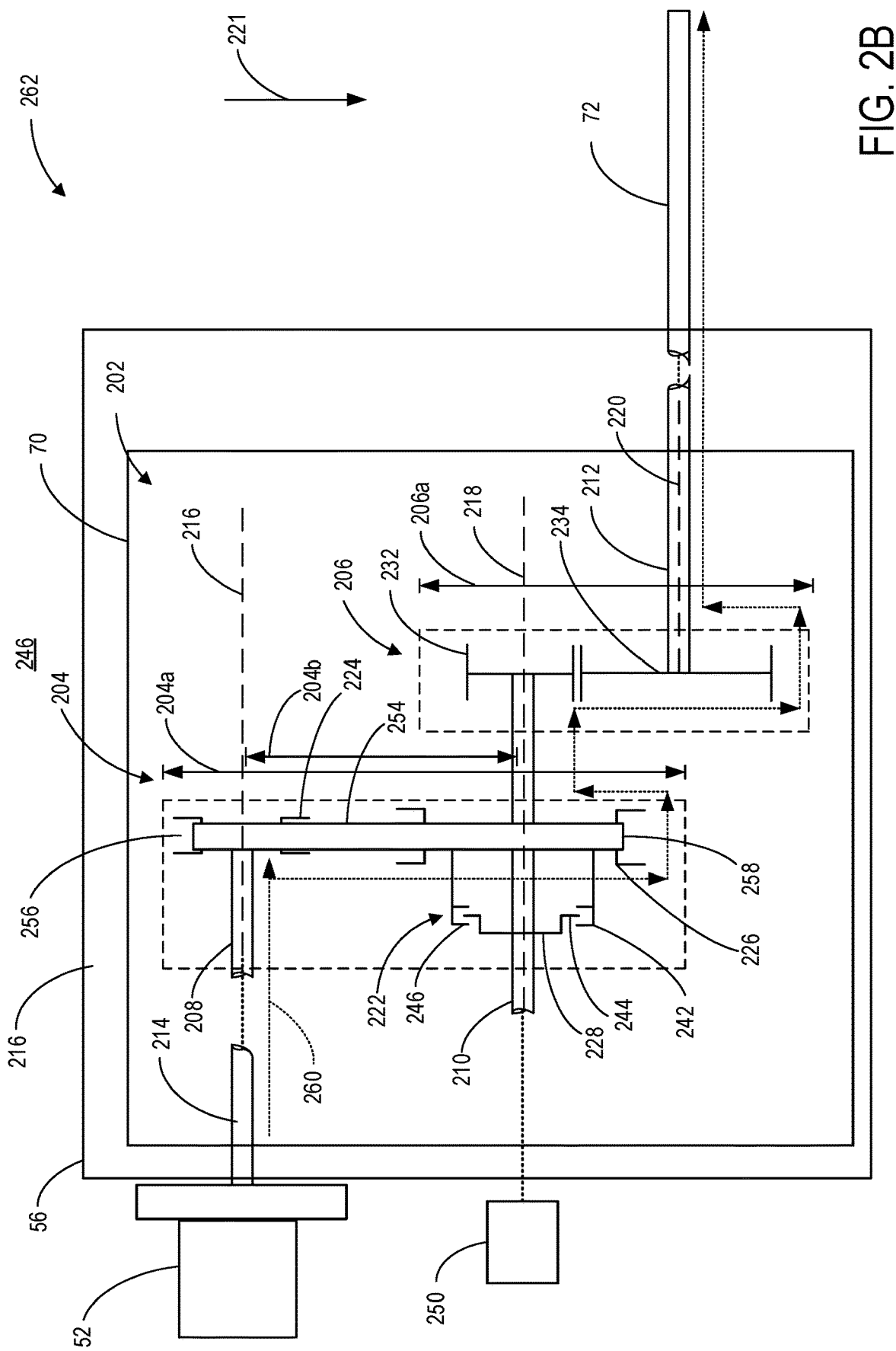
FIG. 2B shows the schematic of FIG. 2A where a belt of the belt drive is attached.
Figure 4C:
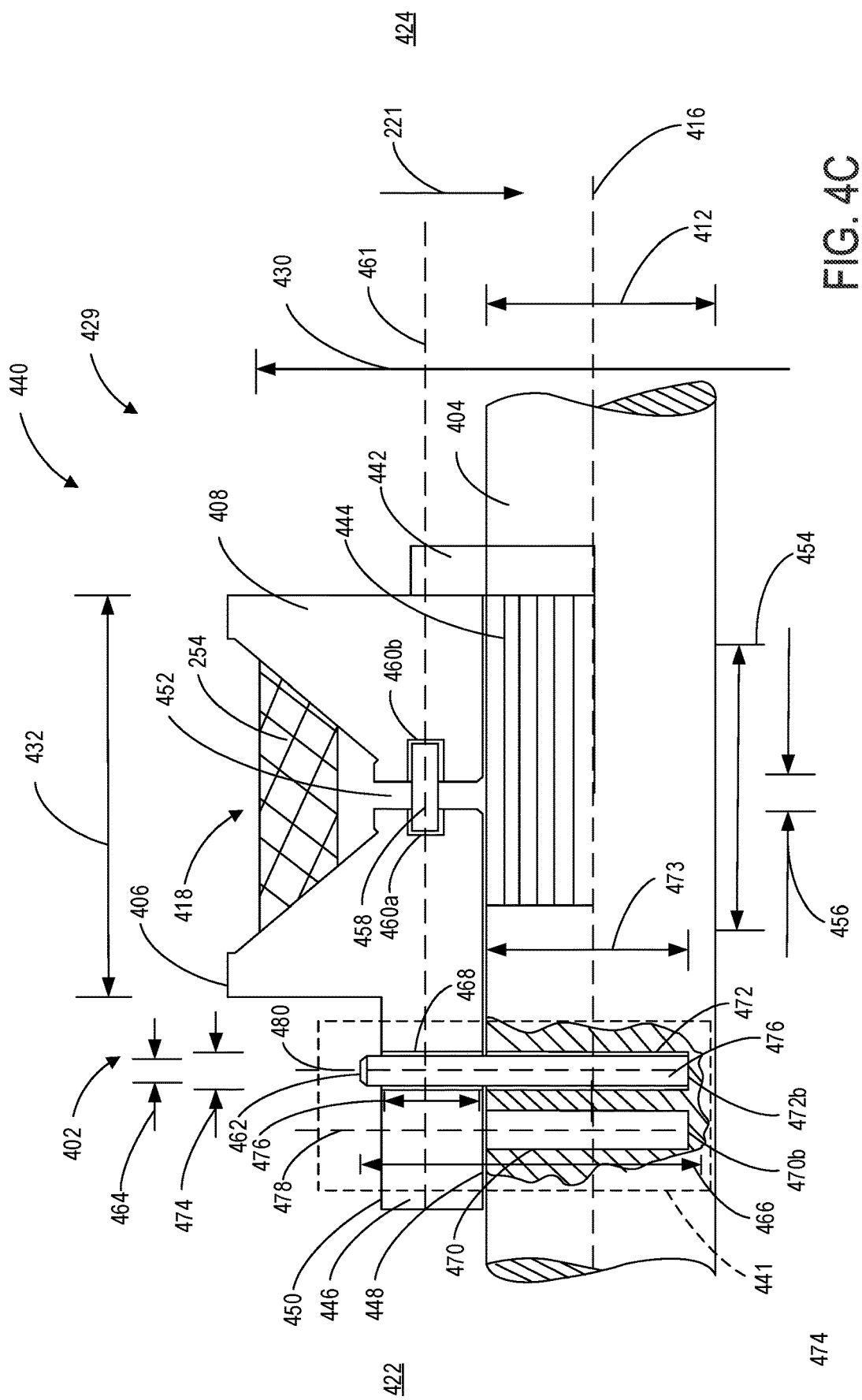
FIG. 4C shows schematically an example of first embodiment of a pulley in FIGS. 4A-B.
Figure 4D:
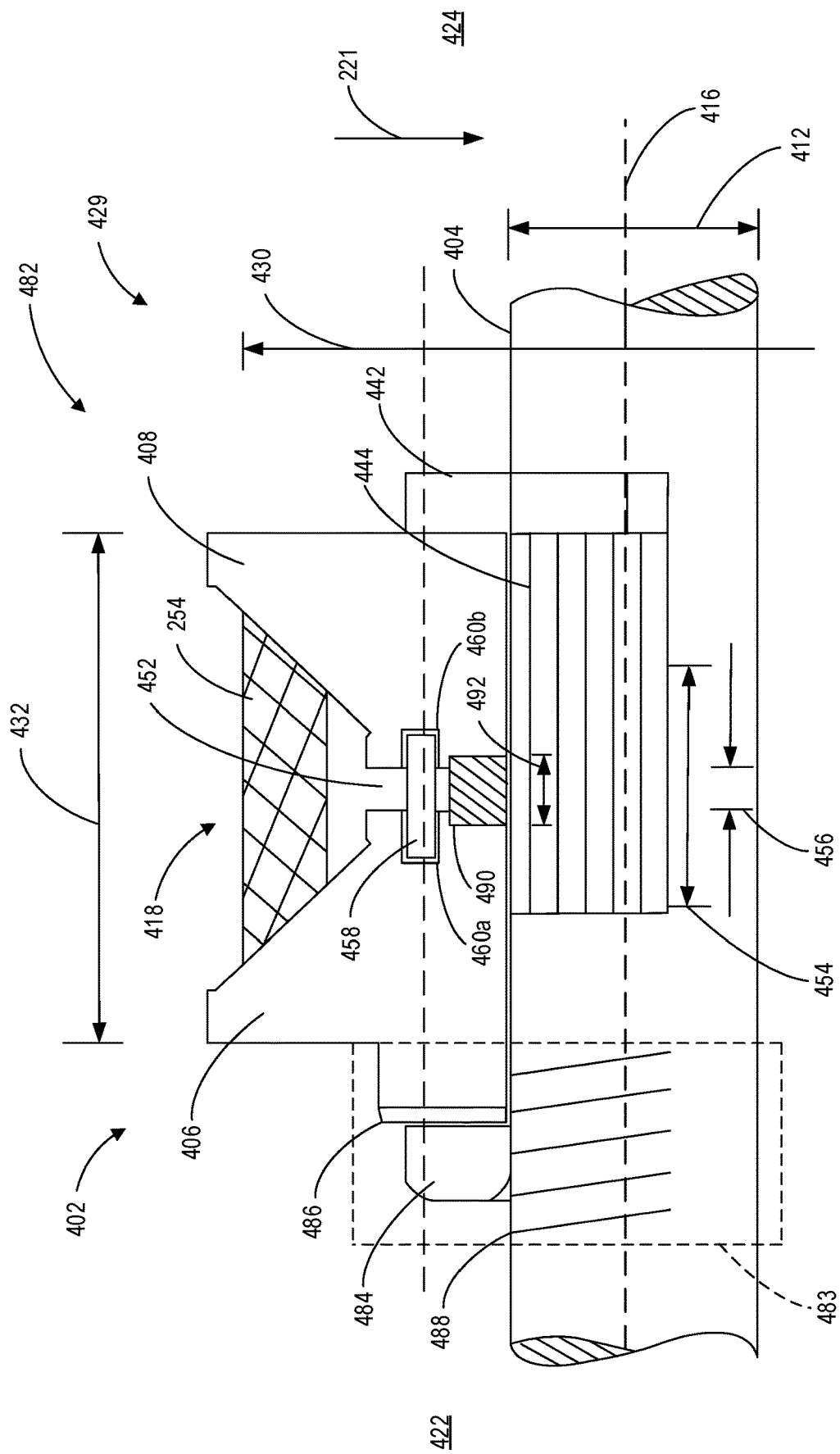
FIG. 4D shows schematically an example of a second embodiment of a pulley in FIGS. 4A-B.
Figure 5:
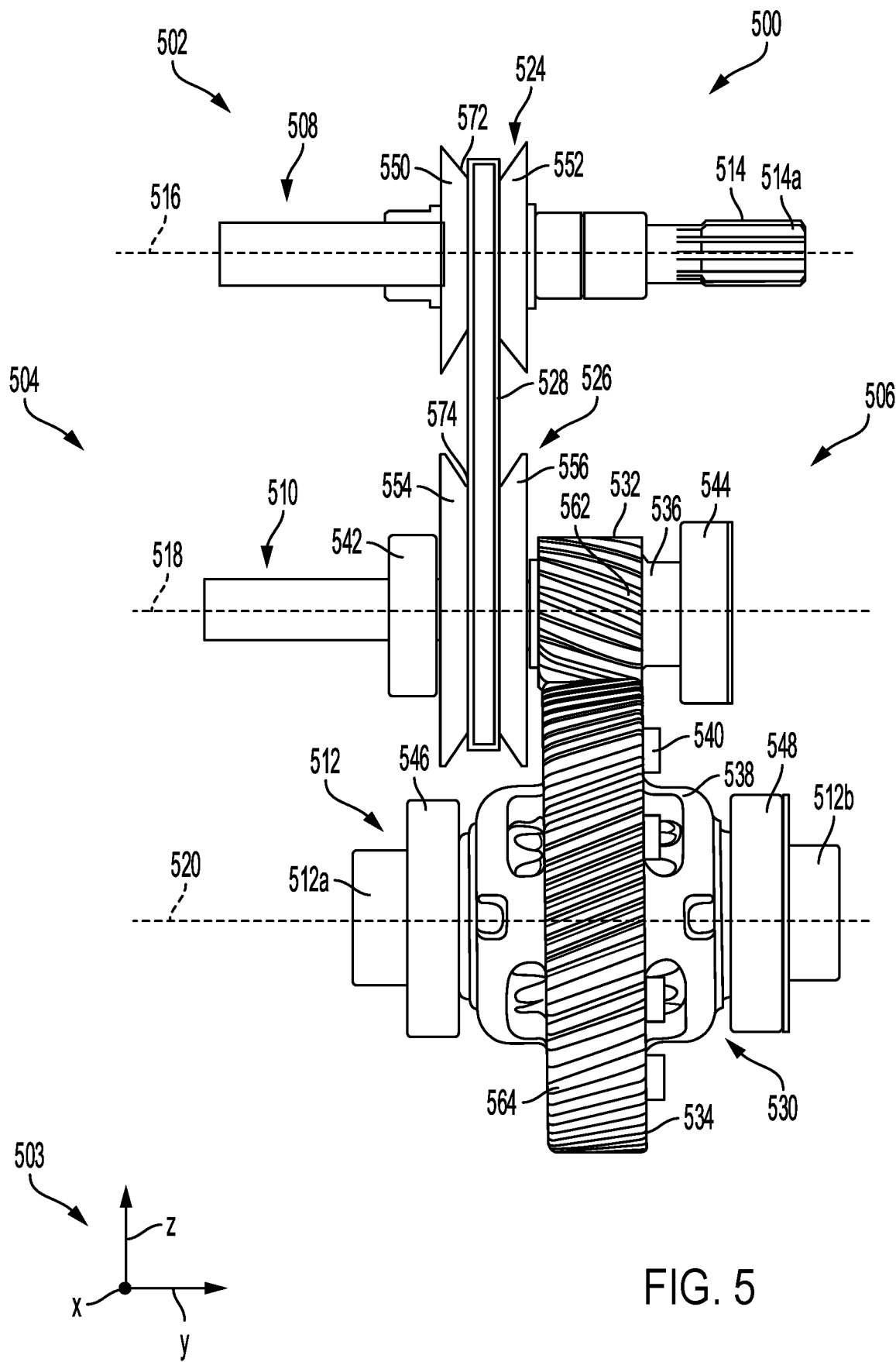
FIG. 5 shows an embodiment gear assembly incorporating a belt drive from a first side view.
Figure 6:
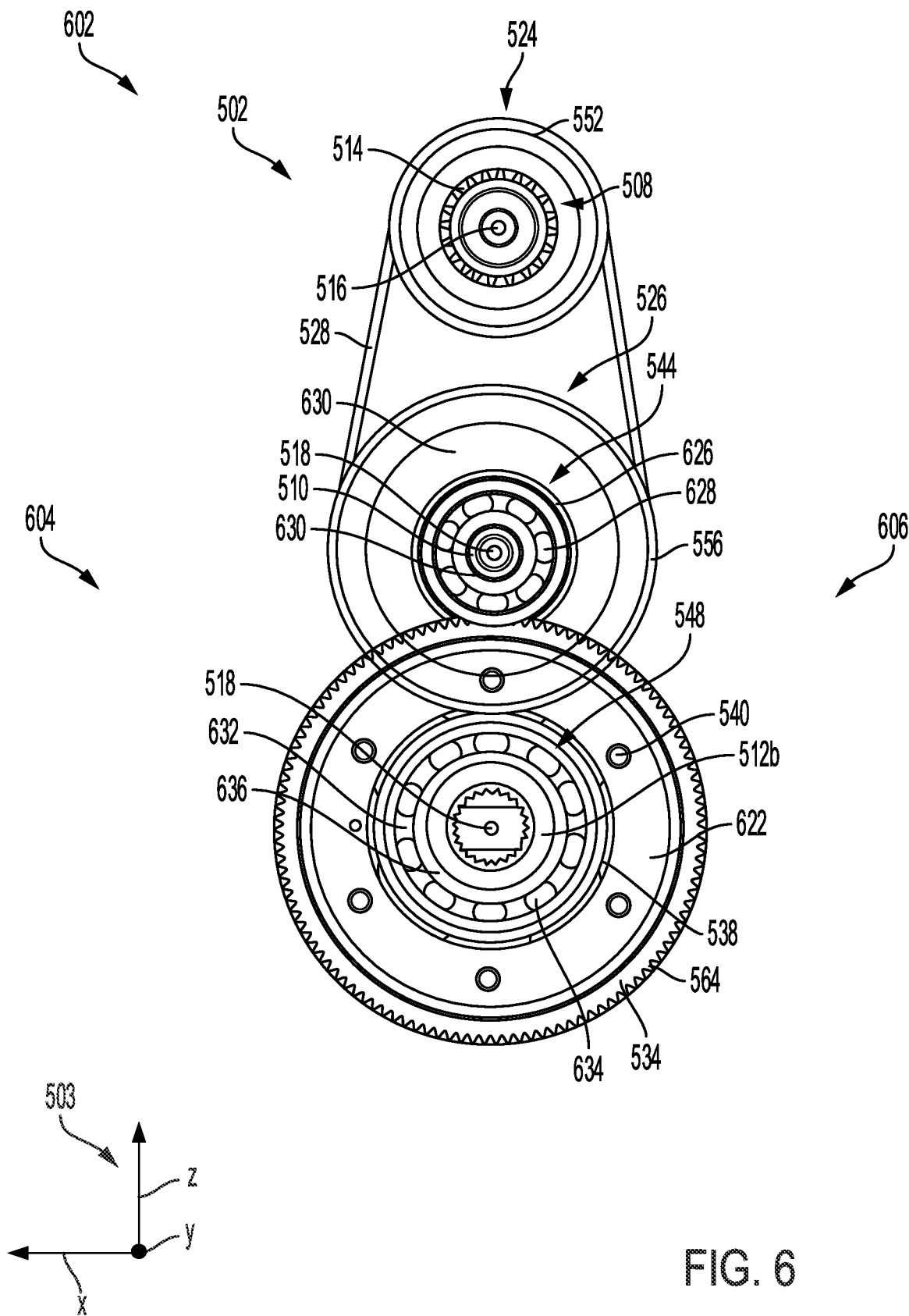
FIG. 6 shows an embodiment gear assembly incorporating a belt drive from a second side view.

A schematic of a vehicle of the present disclosure is depicted in FIGS. 1A-B. FIG. 1A shows a first embodiment of a vehicle of the present disclosure that may have four wheels. FIG. 1B shows a second embodiment of a vehicle of the present disclosure that may have three wheels. The vehicle of FIGS. 1A-B may comprise a transmission that may comprise a gearbox. FIGS. 2A-B shows a schematic of a gear assembly of the present disclosure enclosed by the gearbox of FIGS. 1A-B. Additionally, FIGS. 2A-B show components that the gear assembly may affect or components that the gear assembly may be affected by via the transfer of mechanical energy. The gear assembly in FIGS. 2A-B incorporates a belt drive that may act as a ratio and a first stage for the gear assembly. FIG. 2B shows the belt drive with a belt about and drivingly coupled to the pulleys. FIG. 2B also shows a transfer of mechanical energy via torque through the gear assembly. FIG. 3A shows components of a belt drive in a first position to form a ratio of a first set of dimensions. FIG. 3B shows components of a belt drive in a second position to form a ratio of a second set of dimensions. FIG. 4A shows a pulley of the belt drive of FIGS. 3A-B in a first position having a first effective torque transmitting diameter of the pulley. FIG. 4B shows a pulley of the belt drive of FIGS. 3A-B in a second position having a second effective torque transmitting diameter of the pulley. FIG. 4C shows a first embodiment of the pulley of FIGS. 4A-B. FIG. 4D shows a second embodiment of the pulley of FIGS. 4A-B. The first and second embodiments shown in FIG. 4C and FIG. 4D illustrate different mechanisms for adjusting a position of a pulley half. FIG. 5 shows an example embodiment of a gear assembly incorporating a belt drive from a first view. FIG. 6 shows an example embodiment of a gear assembly incorporating a belt drive from a second view. FIG. 7 shows an isometric view of an example embodiment of a pulley of the second embodiment of FIG. 4D.

FIGS. 1-4D show schematics of example configurations with relative positioning of the various components. FIGS. 5-7 show example configurations with approximate positioning. FIGS. 5-7 are shown approximately to scale; though other relative dimensions may be used. As used herein, the terms "approximately" is construed to mean plus or minus five percent of the range unless otherwise specified.

Further, FIGS. 5-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis unless otherwise specified. Features described as lateral may be approximately perpendicular to an axis unless otherwise specified. Features described as radial may circumferentially surround or extend outward from an axis unless otherwise specified.

Turning to FIG. 1A, an example of a first configuration 6 of a vehicle 5 is shown. The vehicle 5 may have a front end 100 and a rear end 102, and may be bisected into two approximately symmetrical halves by a longitudinal axis 104.

In some examples, vehicle 5 may be a hybrid vehicle with multiple sources of torque available to one or more vehicle wheels 55. For these examples, sources of power may include a combustion engine, an electric motor, and/or mechanical power from an occupant of the vehicle. Alternatively, the vehicle 5 may include solely an internal combustion engine. In other examples, vehicle 5 may be an all-electric (EV) vehicle, powered exclusively by an energy storage device such as a battery 58.

Vehicle 5 includes a prime mover 52. In one example, the prime mover 52 may be an electric machine which may be an electric motor, an electric motor/generator, or an electric motor/engine. The prime mover 52 may receive electrical power from the battery 58 which is converted to rotational energy, e.g., torque, at a transmission 56. In another example the prime mover 52 may be an engine, such as an internal combustion engine. For this example, the prime mover 52 may receive a fuel such as gasoline or diesel to combust, converting chemical energy from the fuel into rotational energy. The rotational energy transmitted as torque at the transmission 56 may be delivered to the vehicle wheels 55. Prime mover 52 may also be operated as a generator to provide electrical power to charge the battery 58, for example, during a braking operation.

In the first configuration 6, the wheels 55 include a set of front wheels proximate to the front end 100 of vehicle 5 and a set of rear wheels proximate to the rear end 102 of vehicle 5. In one example, the vehicle 5 may be a four wheeler vehicle, such as a motorized cart, a car, or a truck. However, the positioning of the wheels may be non-limiting, and other configurations of wheels 55 may be possible (e.g., see second configuration 8 in FIG. 1B).

In the first configuration 6, the embodiment of vehicle 5 has the prime mover 52 and the transmission 56 closest to the front end 100 of vehicle 5. A gearbox 70 is incorporated into the transmission 56. In the example, the prime mover 52 and transmission 56 may provide rotational energy to a drive shaft 72 to transfer rotational energy to a differential 68 to rotate the wheels 55 closest to the rear end 102. It will be appreciated that in other examples, rotational energy may be alternatively provided to the wheels 55 located near the front end 100 of vehicle 5. Furthermore, in other examples, each of the wheels 55 near the front end 100 and the wheels 55 near the rear end 102 may be coupled to individual transmissions, such as when vehicle 5 is configured with all-wheel drive. As well, in other embodiments, the transmission 56 and/or prime mover 52 may be arranged closer to the rear end 102 of vehicle 5 rather than the front end 100. It will be appreciated, that for examples of other embodiments, vehicle 5 may not have a drive shaft 72. For these examples, the differential 68 may be drivingly coupled to the transmission 56 via internal components, such as the gearbox 70.

The battery 58 may be between the vehicle wheels 55 and closer to the rear end 102 of vehicle 5 than the front end 100. For example, the battery 58 may be positioned below rear passenger seats of the vehicle. In another example, the battery 58 may be located in a floor of a rear compartment of the vehicle or may be integrated into a vehicle chassis. In other examples, however, the battery 58 may be located in a different relative position within vehicle 5 than shown in FIG. 1A.

Turning to FIG. 1B, an example of a second configuration 8 of a vehicle 5 is shown. The aforementioned components of the first configuration 6 may be the same or similar in the second configuration 8 and may not be reintroduced.

In the second configuration 8 of vehicle 5, the wheels 55 may include a single front wheel proximate to the front end 100 of the vehicle 5 and a set of rear wheels proximate to the rear end 102 of vehicle 5. Other examples of the second configuration 8 of the vehicle 5 may include the wheels 55 arranged with a set of front wheels proximate to the front end 100 of vehicle 5 and a single rear wheel proximate to the rear end 102 of the vehicle 5. In some examples, the vehicle 5 may be a three wheeler vehicle, such as a motorized rickshaw, a tricycle, or a three wheeler EV.

In one example of the second configuration 8, the transmission 56 and/or prime mover 52 may be arranged closer to the rear end 102 than the front end 100 of the vehicle 5. The second configuration 8 shows vehicle 5 without a drive shaft 72. The differential 68 may be drivingly coupled to the transmission 56 via internal components, such as a single or a plurality of gears of the gearbox 70. The transmission 56 may transfer rotational energy to the differential 68 to rotate the wheel or wheels 55 closest to the rear end 102. In other examples, the prime mover 52 may be arranged closer to the front end 100 of vehicle 5. In some examples, the prime mover 52 may provide rotational energy to a shaft, such as drive shaft 72. The shaft may transfer rotational energy to the transmission 56. For other examples, the transmission 56 and/or prime mover 52 may be arranged closer to the front end 100 of vehicle 5. For these examples, rotational energy may be alternatively provided to the wheel or wheels 55 located near the front end 100 of vehicle 5.

Turning to FIG. 2A a schematic 200 of the transmission 56 and gearbox 70 are shown. The gearbox 70 may be located within and enclosed by the transmission 56. In one example, the gearbox 70 contains a gear assembly 202. Gearbox 70 may be a multi-stage reduction gearbox with the gear assembly 202 acting as a system of a plurality of reduction sets. The gear assembly 202 and gearbox 70 may be part of a line of transmissions that have a range of ratios for at least one reduction set for the transmission 56 or transmissions of approximately the same dimensions. The gear assembly 202 may be formed of at least two reduction sets that may reduce the RPM and increase the torque, referred to herein as stages. There may be a first stage 204 formed of a belt drive and a second stage 206 comprised of gears, such as fixed gears. The first stage 204 may act as a pulley ratio, and the second stage 206 may act as a gear ratio. The ratio of the first stage 204 may be a distance 204a. The belt drive of the first stage 204 may be a variable ratio belt drive, such as a manually variable ratio belt drive, wherein the belt and distance 204a of the ratio of the first stage 204 may be manually adjustable during assembly or manufacture. Distance 204a includes the effective diameters of both pulleys. The distance 204b between the centers of each pulley of the first stage 204 may be fixed and not change during assembly or manufacture. The first stage 204 is fixed at a ratio unless disassembled and adjusted, such that the position is changed and the effective torque transmitting diameter of the pulley is increased. The gear ratio of the second stage 206 may be fixed at a distance 206a.

The gearbox 70 may contain at least three shafts such as a first shaft 208, a second shaft 210, and a third shaft 212. The first stage 204 may be supported by the first shaft 208 and the second shaft 210. The second stage 206 may be supported by the second shaft 210 and the third shaft 212. The first shaft 208 may act as an input to the first stage 204. The second shaft 210 may act as an output for the first stage 204 and an input for the second stage 206. The second shaft 210 may drivingly couple the first stage 204 to the second stage 206. The third shaft 212 may act as an output for the second stage 206. The first shaft 208 may have a length 209. The second shaft 210 may have a length 211. The third shaft 212 may have a length 213.

The first shaft 208 may be centered on a first axis 216. The length 209 of first shaft 208 may be parallel with the first axis 216. Second shaft 210 may be centered on a second axis 218. The length 211 of second shaft 210 may be parallel with the second axis 218. Third shaft 212 may be centered on a third axis 220. The length 213 of third shaft 212 may be parallel with the third axis 220. The first axis 216, second axis 218, and third axis 220 may be parallel with one another. The first stage 204 may traverse the first axis 216 to the second axis 218. The second stage 206 may traverse the second axis 218 to the third axis 220.

The first shaft 208 may drivingly couple a first input shaft to gear assembly 202. For the example shown in schematic 200, the first input shaft may be an output shaft 214 of the prime mover 52. The output shaft 214 may be referred to herein as the prime mover output shaft 214. For this example, the prime mover 52 may be a first electric machine, such as a first electric motor.

The third shaft 212 may be drivingly coupled to a first output shaft. For the example shown in schematic 200, the first output shaft may be the drive shaft 72. However, other configurations of the gearbox 70 are possible. It is to be appreciated there may be additional stages in the form of gear ratios or pulley ratios drivingly coupled to the first and second stages 204, 206.

It is to be appreciated, that the first input shaft to the gear assembly 202 may not be the output shaft 214 of the prime mover 52. In another example, the first input shaft may have a spline that may be drivingly coupled to a gear. The gear or a reduction set using the first gear as a component may drivingly couple the first input shaft to another shaft, such as the output shaft 214 of a prime mover 52. In another example, the first input shaft may be an output shaft of a gear. The gear or a reduction set using the gear as a component may be drivingly coupled to a shaft, such as the output shaft 214 of the prime mover 52. For other examples, there may be a plurality of reduction sets located between and that may drivingly couple the first stage 204 to the output of a prime mover. It is also to be appreciated that the gear assembly 202 may have a plurality of input shafts besides the first input shaft, such as a second input shaft drivingly coupled to a secondary mover 250.

Additionally, it is to be appreciated, that the output shaft of the gear assembly 202 may not be the drive shaft 72. In another example, the output shaft may have a spline that may be drivingly coupled to a gear. The gear or a reduction set using the second gear as a component may be drivingly coupled to a shaft, such as drive shaft 72. In another example, the output shaft may be the input to a gear. For this example, the gear or a gear reduction set using the gear as a component may be drivingly coupled to a shaft, such as drive shaft 72. For these and other examples, there may be a single or plurality of reduction sets located between and that may drivingly couple the first stage 204 to the output of a prime mover.

The transmission 56 and gearbox 70 may be positioned relative to the direction of gravity 221, wherein the direction of gravity 221 points to a bottom and away from a top. The prime mover 52, prime mover output shaft 214, and first shaft 208 may be positioned toward the top of the gearbox 70 relative to the direction of gravity 221. The drive shaft 72 and third shaft 212 may be positioned toward the bottom of the gearbox 70 relative to the direction of gravity 221. However, it should be appreciated that the direction of gravity 221 may be non-limiting. For another example, the prime mover 52, prime mover output shaft 214, and first shaft 208 may be positioned toward the top of the gearbox 70 relative to the direction of gravity 221. For this example, the drive shaft 72 and third shaft 212 may be positioned toward the bottom of the gearbox 70 relative to the direction of gravity 221.

In one example of schematic 200, a clutch 222 may be used to drivingly couple the first stage 204 to the second shaft 210 and the second stage 206. In the schematic 200, clutch 222 may be a frictional clutch, such as a manual clutch, a hydraulic clutch, an electric clutch, or a centrifugal clutch. Clutch 222 may be a single plate clutch with a clutch plate 228. However, the embodiment of the clutch may be non-limiting. For other embodiments clutch 222 may use a plurality of plates. Likewise, for examples of other embodiments clutch 222 may be a fluid flywheel clutch. For other examples, other clutches of the same or similar mechanism to clutch 222 may be used to drivingly couple other components, such as drivingly coupling the first stage 204 to the first shaft 208 or the second stage 206 to the third shaft 212. For other embodiments the first stage 204, second shaft 210, and second stage 206 may be drivingly coupled without the clutch 222.

The first stage 204 may be comprised of a first pulley 224 and a second pulley 226. The first pulley 224 may act as a driving pulley, wherein the driving pulley is attached to a power source or an input, such as a shaft, delivering mechanical energy. The second pulley 226 may act as a driven pulley, wherein the driven pulley may be driven and receive mechanical energy from the driving pulley. The first pulley 224 may transfer mechanical energy from the first shaft 208 to the second pulley 226. The second pulley 226 may transfer mechanical energy to the second shaft 210 and the second stage 206 when drivingly coupled. The first pulley 224 and second pulley 226 may be approximately parallel and engaged in parallel, and therein act as two parallel axis pulleys.

In one example of schematic 200, the clutch 222 does not drivingly couple the second pulley 226 to the second shaft 210 and second stage 206. The clutch 222 may engage and be locked to drivingly couple the second pulley 226 to the second shaft 210. To engage and lock the clutch 222, a clutch plate 228 may engage and drivingly couple with a fly wheel 242 in a process referred to herein as a locking.

In one example, the fly wheel 242 may be coupled to or formed from the second pulley 226. For this example, the clutch 222 may be coupled to or formed from the second shaft 210. The clutch plate 228 may extend radially from and/or be about the second shaft 210, with respect to the second axis 218. Likewise, the fly wheel 242 may extend axially from the second pulley 226, with respect to the second axis 218. The fly wheel 242 may be located about and circumferentially surround the second shaft 210. However, for examples of other embodiments the fly wheel 242 may be formed from or coupled to the second shaft 210. For these examples, the clutch plate 228 may be formed from or attached to the second pulley 226. For these examples, the fly wheel 242 may extend radially from the second shaft 210, and the clutch plate may extend axially from the second pulley 226, with respect to the second axis 218.

In other examples, the first shaft 208 may act similarly to the second shaft 210 and support the clutch 222. For these examples the first shaft 208 may support components of the clutch, such as the clutch plate 228 or fly wheel 242. For these examples the first pulley 224 may support components of the clutch, such as the fly wheel 242 or the clutch plate 228 if the first shaft 208 supports the clutch plate 228 or fly wheel 242, respectively.

In another example, the third shaft 212 may act similarly to the second shaft 210 and support the clutch 222. For example, the third shaft 212 may support components of the clutch 222, such as the clutch plate 228 or fly wheel 242. The second gear 234 may support components of the clutch 222, such as the fly wheel 242 or the clutch plate 228 if the third shaft 212 supports the clutch plate 228 or fly wheel 242, respectively.

As an example, the clutch plate 228 may lock with the fly wheel 242 when a plurality of teeth 244 of the clutch plate 228 engage with a plurality of teeth 246 of the fly wheel 242. The clutch plate 228 may translate past the teeth 246 of the fly wheel 242, allowing the teeth 244 and teeth 246 to engage.

The second stage 206 may comprise a first gear 232 and a second gear 234. The first gear 232 may be in surface sharing contact with and located about the second shaft 210. Alternatively, the first gear 232 may be formed from the second shaft 210. The first gear 232 may be drivingly coupled to the second shaft 210. The second gear 234 may be in surface sharing contact with and located about the third shaft 212. Alternatively, the second gear 234 may be formed from the third shaft 212. The second gear 234 may be drivingly coupled to the third shaft 212. The second axis 218 and third axis 220 may be concentric to the first and second gears 232, 234, respectively. The first and second gears 232, 234 may be fixed gears, such as fixed helical gears, wherein the ratio formed between the gears is not adjustable. The first and second gears 232, 234 may be the same fixed gears across a plurality of embodiments, whereas the ratio of the first stage 204 is adjustable within a range. The first and second gears 232, 234 may be meshed via complementary teeth. When meshed, the first and second gears 232, 234 may be drivingly coupled. The first and second gears 232, 234 may drivingly couple the second shaft 210 and third shaft 212.

The first shaft 208, second shaft 210, and third shaft 212 may be coupled to other components besides the first input shaft and first output shaft, such as secondary mover 250. The secondary mover 250 may be a mover, such as an electric machine (e.g., a second electric motor supplementing the first electric motor). The secondary mover 250 may have a different torque range or speed range from the prime mover 52. For the example in schematic 200, the output of a secondary mover 250 may be drivingly coupled to the second shaft 210. The secondary mover 250 may supply a counter torque to the second shaft 210. The secondary mover 250 may supply a lower torque and higher speed of rotation to the second shaft 210. The secondary mover 250 may be driven by a torque from the second shaft 210 and act as a generator to generate electricity for the vehicle. For another example, the second shaft 210 may be drivingly coupled to the output of the prime mover 52 via another reduction set.

Returning to first stage 204, the first pulley 224 and second pulley 226 may have a first sheave 256 and a second sheave 258 respectively. The first sheave 256 and second sheave 258 may be located about and circumferentially surround portions of the first and second pulleys 224, 226, respectively. A belt, such as belt 254 with reference to FIG. 2B, may be supported by the first sheave 256 and second sheave 258.

FIG. 2B shows a schematic 262. Schematic 262 shows the transmission 56 and gearbox 70 of schematic 200, wherein the clutch 222 is engaged, drivingly coupling the second pulley 226 to the second shaft 210. Schematic 262 shows a belt 254 supported by the first and second sheaves 256, 258. The first and second sheaves 256, 258 may prevent decoupling of and prevent degradation to the belt 254. The belt 254 may drivingly couple the first pulley 224 to the second pulley 226. Additionally, the belt 254 may be a dry belt, wherein the belt 254 may not be lubricated with lubricant, such as oil, when the first stage 204 is driven to transfer and increase torque. The belt 254 drive may therein reduce the amount and/or increase the life span of lubricant used in the gearbox 70 by replacing components, such as gears, that may be lubricated during operations.

The belt 254 is capable of having different ratios that may be set for a vehicle application during assembly. For example, during assembly of the gearbox, the belt 254 and components of the first stage 204 may be fixed at a location to give a single ratio that is fixed. To set a different ratio, the location of the belt drive of the first stage 204, including the first and second pulleys 224, 226 and the belt 254, may be adjusted manually when the gearbox 70 and gear assembly 202 are disassembled.

Schematic 262 shows an example of a power flow 260 through the gear assembly 202. Power flow 260 may be represented by a plurality of arrows and dotted lines. The power flow 260 represents a transfer of mechanical energy in the form of torque from the prime mover output shaft 214, to the gear assembly 202 and drive shaft 72. The torque from the prime mover output shaft 214 may cause the first shaft 208 and first pulley 224 to spin about the first axis 216. The power flow 260 may continue and the spinning of the first axis 216 may transfer mechanical energy in the form of torque from the first shaft 208 to the belt 254. The belt 254 may transfer mechanical energy in the form of torque to the second pulley 226. The second pulley 226 may spin about the second axis 218. For this example, clutch 222 may drivingly couple the second pulley 226 to the second shaft 210. The second pulley 226 may transfer mechanical energy in the form of torque to the second shaft 210. The spinning of the second shaft 210 may transfer mechanical energy in the form of torque into the first gear 232, forcing the first gear 232 to spin about the second axis 218. The first gear 232 may be meshed with the second gear 234, therein transferring mechanical energy in the form of torque to the second gear 234. The second gear 234 may spin about the third axis 220 and transfer mechanical energy in the form of torque to the third shaft 212. The third shaft 212 may spin about the third axis 220 and transfer mechanical energy via torque to the drive shaft 72. As mechanical energy is transferred between the pulleys or gears, the speed of rotation, e.g., rotation per minute (RPM), may be slowed and the torque may increase. The first and second stages 204, 206 may therein slow the RPM and increase the torque. The power flow 260 may end by transferring mechanical energy and increasing torque from output shaft 214 into the drive shaft 72.

Turning to FIG. 3A and FIG. 3B, the first stage 204 may be shown schematically in different positions. For example, the first stage 204 is shown in a first position 300 in FIG. 3A. For another example the first stage 204 is shown in a second position 330 in FIG. 3A. The first position 300 may be used for a first multi-stage reduction gearbox. The second position 330 may be used for a second multi-stage reduction gearbox. The housing of the first multi-stage reduction gearbox and the housing of the second multi-stage reduction gear box may be the same or have approximately the same dimensions.

Turning to FIG. 3A, the first stage 204 in the first position 300 may have a first ratio distance 306. The first ratio distance 306 may be the distance the belt 254 may be stretched when about the first pulley 224 and second pulley 226. The first ratio distance 306 may be a variant of distance 204a, with reference to FIGS. 2A-B.

The first sheave 256 of the first pulley 224 may be formed between a first pulley half and a second pulley half. The first pulley half and second pulley half may be formed of or incorporate a variator component. For one example, the first pulley half is a first variator 310 and second pulley half is a second variator 312 for the first pulley 224. Likewise, the second sheave 258 of the second pulley 226 may be formed between a first pulley half and a second pulley half. For one example, the first pulley half is a third variator 314 and the second pulley half is a fourth variator 316 for the second pulley 226. The first variator 310, second variator 312, third variator 314, and fourth variator 316 may be variator cones that are conical in shape. However, the first pulley halves and second pulley halves of the first pulley 224 and second pulley 226 may be or incorporate another type of variator of a different shape, such as a variator with a concave spherical surface, a variator with a convex spherical surface, a variator of a ball type spherical mechanism, or a variator formed of staggered cylinders of varied effective torque transmitting diameters coupled to spheres or ball bearings.

To change the position of the first stage 204, the location of the first pulley 224 and second pulley 226 may be changed. Likewise, the position of the variators that form the first and second pulleys 224, 226 may be adjusted to change the position of the first stage 204. As the position of the variators change, the ratio distance of their respective pulleys may be changed. The belt 254 is physically capable of having different ratios; however, when coupled to the first stage 204 the belt 254 is fixed at a location and a ratio. Changing the position of the first stage 204 to a new position from a previous position, such as to first position 300 or second position 330, may change the ratio of the belt 254 and belt drive of the first stage 204. For example, decreasing the distance between variators, with respect to the first and second axes 216, 218 may change the position and increase the distance between the first and second pulleys 224, 228. The distance of the ratio between the first and second pulleys 224, 228 may therein increase. For another example, increasing the distance between variators, with respect to the first and second axes 216, 218, may change the position and decrease the distance between the first and second pulleys 224, 228. The distance of the ratio between the first and second pulleys 224, 228 may therein decrease.

In the first position 300, the first and second variators 310, 312 may be separated by a first distance 322. In the first position 300, the third and fourth variators 314, 316 may be separated by a second distance 324. In first position 300, the first and second pulleys 224, 226 may have first ratio distance 306.

Turning to FIG. 3B, in a second position 330, the first stage 204 may have a second ratio distance 336. In the second position 330, the first and second variators 310, 312 may be separated by a third distance 352. In the second position 330, the third and fourth variators 314, 316 may be separated by a fourth distance 354. In the example, the third distance 352 may be less than the first distance 322 and the fourth distance 354 may be less than the second distance 324, with reference to FIG. 3A. The second ratio distance 336 may therein be greater than the first ratio distance 306. The ratio of the first stage 204 may be greater when in the second position 330 compared to the first position 300, increasing the torque and decreased RPM to the second shaft 210. Thus, while the belt 254 is fixed in the first position 300 (e.g. during assembly) giving it a single fixed ratio, when the belt 254 is assembled in a second, different position, the belt 254 gives a different ratio. In this way, a line of transmissions are provided using the same hardware but with different ratios in that they are assembled in different positions.

Turning to FIG. 4A and FIG. 4B, a pulley 402 is shown in a first view 400. The pulley 402 is shown in a first position 401 in FIG. 4A. The pulley 402 is shown in a second position 429 in FIG. 4B. The first position 401 may be used for a first stage, such as the first stage 204 with reference to FIG. 2A-3B, of a first multi-stage reduction gearbox. The second position 429 may be used for a first stage, such as the first stage 204 with reference to FIG. 2A-3B, of a second multi-stage reduction gearbox. The first stage of the first multi-stage reduction gearbox and the first stage of the second multi-stage reduction gear box may be each of different ratios that produce different torque ranges. For example, the first position 401 and second position 429 may be the first and second positions 300, 330, respectively, with reference to FIGS. 3A-B. For this example, pulley 402 may be a pulley used for the first stage 204, such as first pulley 224 or second pulley 226, in a gear assembly of the present disclosure. For the example shown in view 400, the pulley 402 may be a driving pulley, such as first pulley 224. For another example, the pulley 402 may be a driven pulley, such as second pulley 226.

The pulley 402 may be located about a shaft 404 between a first side 422 and a second side 424. The shaft 404 may be centered on a central axis 416, wherein the central axis 416 may be concentric to the shaft 404. For the example shown in view 400, the shaft 404 may be an input shaft, such as first shaft 208, with reference to FIGS. 2A-B. If the shaft 404 is first shaft 208, the central axis 416 may be the first axis 216, with reference to FIGS. 2A-B. It is to be appreciated, that in another example, the shaft 404 may be an output shaft such as second shaft 210, with reference to FIGS. 2A-B. If the shaft 404 is the second shaft 210, the central axis 416 may be the second axis 218, with reference to FIGS. 2A-B.

The pulley 402 may be located about a pulley cover 414. The pulley cover 414 may protect the belt 254 from degradation against the shaft 404. The belt 254 and/or pulley 402 may have surface sharing contact with the pulley cover 414. The pulley cover 414 may be located about and circumferentially surround the shaft 404. It is to be appreciated that for other examples, the pulley 402 may be used without the pulley cover 414. For these examples, the belt 254 and pulley 402 may have surface sharing contact with the shaft 404.

The pulley 402 may be comprised of two pulley halves: a first pulley half 406 and a second pulley half 408. A sheave 418 may be formed between the first pulley half 406 and second pulley half 408. For the first and second positions 401, 429, the first pulley half 406 may be located closer to the first side 422 and the second pulley half 408 may be positioned closer to the second side 424. However, it is to be appreciated that for other examples, the first pulley half 406 may be located closer to the second side 424 and the second pulley half 408 may be positioned closer to the first side 422.

For one example, the pulley 402 may be the first pulley 224, with reference to FIGS. 2A-3B. For this example, the first pulley half 406 may be the first variator 310 and the second pulley half 408 may be the second variator 312 of the first pulley 224, with reference to FIGS. 3A-B. For this example, the sheave 418 may be the first sheave 256 with reference to FIGS. 2A-3B. However, it is to be appreciated that for other examples, the first pulley half 406 may act as the second variator 312 and the second pulley half 408 may act as the first variator 310.

Likewise, for another example, the pulley 402 may be the second pulley 226, with reference to FIGS. 2A-3B. For the example in view 400, the first pulley half 406 may be the third variator 314 and the second pulley half 408 may be the fourth variator 316 of the second pulley 226, with reference to FIG. 3A-B. For this example, the sheave 418 may be the second sheave 258. However, it is to be appreciated that for other examples, the first pulley half 406 may act as the fourth variator 316 and the second pulley half 408 may act as the third variator 314.

The pulley 402 may have a pulley diameter. A pulley diameter may be defined by the diameter at which a belt, such as belt 254, may curve about a pulley. The pulley diameter may be the effective torque transmitting diameter of the pulley 402. The pulley diameter and the distance between the first and second pulley halves 406, 408 may be inversely related, wherein the pulley diameter increases as the distance between the first and second pulley halves 406, 408 decreases. The first pulley half 406 may be of a shape with a diameter 406a that is variable. The diameter 406a may gradually increase along the central axis 416 from a first plane 406b to a second plane 406c on opposite sides of the first pulley half 406. Likewise, the second pulley half 408 may be of a shape with a diameter 408a that is variable. The diameter 408a may gradually increase along central axis 416 from a third plane 408b to a fourth plane 408c on opposite sides of the second pulley half 408. The first plane 406b, second plane 406c, third plane 408b, and fourth plane 408c may extend radially from the central axis 416. As the distance between the first pulley half 406 and second pulley half 408 decreases, the diameters 406a, 408a that support the belt 254 may increase, increasing the size of the pulley diameter.

Turning to FIG. 4A, when in the first position 401, the pulley 402 may be of a first pulley diameter 410. For one example, the first pulley diameter 410 may be approximately the same distance as the diameter 412 of the shaft 404. To create pulley diameter 410, the first and second pulley halves 406, 408 may be separated by a distance 420.

Turning to FIG. 4B, when in the second position 429, the pulley 402 may have a second pulley diameter 430. To create the second pulley diameter 430, the first and second pulley halves 406, 408 may be separated by a distance 432. Distance 432 may be shorter compared to distance 420, therein the second pulley diameter 430 may be greater than first pulley diameter 410. Decreasing the distance from distance 420 to distance 432 may increase the effective torque transmitting diameter of the pulley 402.

Turning to FIG. 4C, it shows a first embodiment 440 of the pulley 402. Embodiment 440 may use a first mechanism 441 as a mechanical lock for selecting and locking a ratio of a belt drive, such as the first stage 204 with reference to FIG. 2A-3B, during the assembly or maintenance of a gearbox. First mechanism 441 is indicated by a box formed of dashed lines.

The first mechanism 441 may act as a mechanical lock to lock in place at least a pulley half, such as the first pulley half 406 or second pulley half 408, during the assembly or maintenance of a gearbox housing the pulley 402. The first mechanism 441 may lock in place each pulley half, such as the first pulley half 406 or second pulley half 408, during the assembly or maintenance of a gearbox housing the pulley 402.

The pulley 402 of the first embodiment 440 may be in the second position 429 including the distance 432 between the first and second pulley halves 406, 408 and the second pulley diameter 430. The first and second pulley halves 406, 408 may be threadingly coupled to the shaft 404 via a plurality of threads 444. The threads 444 may be approximately parallel with and radially surround the central axis 416. The first and second pulley halves 406, 408 may have threads complementary to threads 444. When locked with threads 444, the first and/or second pulley halves 406, 408 may slide axially with respect to the central axis 416. A collar 442 extending radially about the shaft 404 may be positioned between the threads 444 and the second side 424, with respect to the central axis 416. The collar 442 may prevent the first and/or second pulley halves 406, 408 from sliding toward the second side 424 past the threads 444. The collar 442 may be coupled about, fastened to, or formed from the shaft 404.

The first mechanism 441 is a pin locking mechanism that may use a plurality of pins springingly coupled to springs, wherein a spring may extend to lock a pulley half in a position. Each of the pins of the first mechanism 441 may be springingly coupled to a spring. For this example, the first mechanism 441 may be a spring dowel mechanism that may use a plurality of dowels, such as spring dowels, as the pins.

An extension 446 may be formed from or coupled to a pulley half. The entire or a portion of the extension 446 may be located radially about the first mechanism 441, with respect to the central axis 416. For the example of the first embodiment 440, the extension 446 may be formed from or coupled to the first pulley half 406. An inner surface 448 of the extension 446 and first pulley half 406 may be located about the central axis 416 and shaft 404. The inner surface 448 may have face sharing contact with the shaft 404. The extension 446 may have an outer surface 450 located about the inner surface 448 and material of the extension 446. The extension 446 may extend axially, with respect to the central axis 416, from the first pulley half 406 toward the first side 422.

A gap 452 may be located between the first pulley half 406 and second pulley half 408 with respect to the central axis 416. The gap 452 may be located radially below the sheave 418 with respect to the central axis 416. The gap 452 may be about and/or circumferentially surround the shaft 404. The distance formed between the gap 452 may be increased or decreased by adjusting the axial position of the first pulley half 406 relative to the central axis 416. As the distance of the gap 452 increases the distance between the first and second pulley halves 406, 408 increases and the effective torque transmitting diameter of the pulley 402 decreases.

For one example, the gap 452 may be of a first distance 454 when the pulley 402 is in a first position 401. To adjust the pulley 402 from the first position 401 to the second position 429, the gap 452 may be decreased from the first distance 454 to a second distance 456.

An alignment dowel 458 may be used to align the first and second pulley halves 406, 408, such that the first and second pulley halves 406, 408 are approximately parallel and level with respect to the central axis 416. The alignment dowel 458 may be fit to and housed by a first hole 460a and a second hole 460b, such that the first and second holes 460a, 460b partially enclose and have portions circumferentially surrounding the dowel 458. The first hole 460a and second hole 460b may be aligned, such that an axis 461 may be approximately concentric to the first and second holes 460a, 460b. When the first and second holes 460a, 460b are aligned, the axis 461 may be concentric to the alignment dowel 458. Axis 461 may be approximately parallel with respect to the central axis 416. The first hole 460a and second hole 460b may be formed from and partially enclosed by the material of the first and second pulley halves 406, 408, respectively.

For the first embodiment 440, the first mechanism 441 may use a plurality of dowels, such as spring dowels, to lock the first pulley half 406 into a position for a ratio, such as the first or second position 401, 429. The first mechanism 441 may have at least a dowel, such as dowel 462, that may act as a pin for the first mechanism 441. The dowel 462 may have a diameter 464 and a length 466. The dowel 462 may be a spring dowels, wherein the dowel 462 may be a c-shaped dowel with a cut or gap down the length 466. As a spring dowel, the diameter 464 of the dowel 462 may be variable. When force is applied to the dowel 462 in direction along an axis not parallel with the length 466, the diameter 464 may contract into a contracted state. When force is removed from the dowel 462 in direction along an axis not parallel with the length 466, the diameter 464 may expand or remain expanded.

The first mechanism 441 and dowels, such as the dowel 462 may be positioned on a side of a pulley half opposite axially to a gap formed between a pulley, with respect to an axis concentric to the pulley. For example, the first mechanism 441 and the dowel 462 may be positioned between the first side 422 and first pulley half 406. For this example, the first mechanism 441 is on the side of the first pulley half 406 opposite axially from the sheave 418 and gap 452, with respect to the central axis 416.

The mechanism 441 may comprise a third hole 470 and a fourth hole 472 surrounded by the material of the shaft 404. It is to be appreciated, that the number of holes surrounded by the material of the shaft 404 may be non-limiting. For example, there may be a greater number of holes of approximately the same dimensions and a similar function to third hole 470 and fourth hole 472 partially enclosed by the material of the shaft 404. The mechanism 441 may also comprise a fifth hole 468 surrounded by the material of the extension 446. The third hole 470, fourth hole 472, and fifth hole 468 may be cylindrical in shape and have diameters that are approximately the same as a diameter 474. The third hole 470 and fourth hole 472 may each have dimensions, such as a length 473, that are approximately the same between each hole. Lengths 473 of the third hole 470 and fourth hole 472 may extend approximately perpendicular to the central axis 416. The lengths 473 of the third hole 470 and fourth hole 472 may extend through the material of shaft 404. The fifth hole 468 may be of a length 476. The length 476 of the fifth hole 468 may extend approximately perpendicular to the central axis 416. The length 476 of the fifth hole 468 extends from the outer surface 450 to the inner surface 448 through the material of the extension 446. The length 466 of the dowel 462 may be greater than combined distance of length 473 and length 476.

When the dowel 462 is contracted, the diameter 464 may be less than the diameter 474 of the third hole 470, fourth hole 472, and fifth hole 468. When contracted, the dowel 462 may be inserted through the third hole 470, fourth hole 472, and/or fifth hole 468. When the dowel 462 is expanded, the diameter 464 may be approximately the same as or greater than the diameter 474 of the third hole 470, fourth hole 472, and fifth hole 468. When the diameter 464 is expanded or partially expanded, the surfaces of the dowel 462 may abut the surfaces the third hole 470, fourth hole 472, and/or fifth hole 468.

For the example shown in FIG. 4C, the dowel 462 may be partially enclosed and housed by the fourth hole 472. The dowel 462 may be in surface sharing contact with the surfaces of the fourth hole 472, such as a base 472b. The dowel 462 may extend through the fifth hole 468 and fourth hole 472. However, for other examples, the dowel 462 may extend through the fifth hole 468 and another hole, such as the third hole 470. For another example the dowel 462 may be partially enclosed and housed by the third hole 470. For this example, the dowel 462 may be in surface sharing contact with the surfaces of the third hole 470, such as a base 470b.

The third hole 470 may be centered about a fourth axis 478. The fourth hole 472 may be centered about a fifth axis 480. The fourth and fifth axes 478, 480 may be perpendicular and/or radial with respect to the central axis 416. The fifth hole 468 may be aligned with the third hole 470, such that the fifth hole 468 and third hole 470 are each approximately centered about the fourth axis 478. The fifth hole 468 may be aligned with the fourth hole 472, such that the fifth hole 468 and fourth hole 472 are each approximately centered about the fifth axis 480.

For an example, the first embodiment 440 may be locked in the first position 401 via the dowel 462, the fifth hole 468, and the third hole 470. When the fifth hole 468 and third hole 470 are aligned, the gap 452 may be of the first distance 454. When the fifth hole 468 and third hole 470 are aligned, the dowel 462 may be inserted through the fifth and third holes 468, 470. The dowel 462 may be translated axially through the fifth hole 468 and third hole 470, with respect to the fourth axis 478, until the dowel abuts the base 470b. The dowel 462 may have surface sharing contact with the surfaces formed from and partially enclosed by third hole 470. The dowel 462 may be approximately centered about the fourth axis 478. When partially enclosed by the third and fifth holes 470, 468, the dowel 462 may prevent the movement of the first pulley half 406 axially with respect to the central axis 416. The dowel 462 may lock the pulley 402 in a first position 401 when partially enclosed by fifth hole 468 and third hole 470.

To adjust the position of the pulley 402 and the alignment of the fifth hole 468, the dowel 462 may be removed from the third and fifth holes 470, 468. The dowel 462 may be translated approximately along the fourth axis 478 perpendicularly and/or radially away from the central axis 416 and out of the third and fifth holes 470, 468. To translate the dowel 462 along the fourth axis 478, the diameter 464 may be contracted.

For the example shown in FIG. 4C, the first embodiment 440 may be locked in the second position 429 via the dowel 462, the fifth hole 468, and the fourth hole 472. When the fifth hole 468 and fourth hole 472 are aligned, the gap 452 may be of the second distance 456. When the fifth hole 468 and fourth hole 472 are aligned, the dowel 462 may be inserted through the fifth hole 468 and fourth hole 472. The dowel 462 may be translated axially through the fifth hole 468 and fourth hole 472, with respect to the fifth axis 480, until the dowel abuts the base 472b. The dowel 462 may abut the base 472b and have surface sharing contact with the surfaces formed from and partially enclosed by the fourth hole 472. The dowel 462 may be approximately centered about the fourth axis 478. When partially enclosed by the fourth and fifth holes 472, 468 the dowel 462 may prevent the movement of the first pulley half 406 axially with respect to the central axis 416. The dowel 462 may lock the pulley 402 in the second position 429 when partially enclosed by fifth hole 468 and fourth hole 472. The dowel 462 may be approximately centered about the fifth axis 480. As the shaft may include a plurality of holes to receive the dowel at different axial positions, the pulley may be positioned at various axial positions during manufacture to enable different gear ratios.

To adjust the position of the pulley 402 and the alignment of the fifth hole 468, the dowel 462 may be removed from the fourth and fifth holes 472, 468. The dowel 462 may be translated approximately along the fifth axis 480 perpendicularly and/or radially away from the central axis 416 and out of the fourth and fifth holes 472, 468. To translate the dowel 462 along the fifth axis 480, the diameter 464 may be contracted.

Turning to FIG. 4D, it shows a second embodiment 482 of the pulley 402. The second embodiment 482 may use a second mechanism 483, different from the first mechanism 441, for selecting and locking a ratio for a belt drive, such as first stage 204, during assembly or maintenance of a gearbox housing the pulley 402. The second mechanism 483 is indicated by a box formed of dashed lines and may include a threaded member and a tightening member that locks the pulley in place when tight, but when loose enables the pulley to slide axially thus enabling a range of axial positions during manufacture.

Second mechanism 483 may act as a mechanical lock to lock in place at least a half of a pulley, such as the first pulley half 406 or second pulley half 408. The second mechanism 483 may act as a mechanical lock to lock in place each half of a pulley, such as the first pulley half 406 or second pulley half 408. In one example, the tightening or loosening of the second mechanism 483 may lock a pulley half in the first position 401 to form a first fixed ratio for the belt drive. Additional tightening or loosing of the second mechanism 483 may lock a pulley half in the second position 429 to form a second fixed ratio for the belt drive. The pulley 402 of the second embodiment 482 may be in the second position 429 including the distance 432 between the first and second pulley halves 406, 408 and the pulley diameter 430.

The second mechanism 483 may be positioned about the shaft 404. The second mechanism 483 may be positioned on a side of the first or second pulley half 406, 408 opposite axially from the sheave 418 and the gap 452, with respect to the central axis 416. For the example in second embodiment 482, the second mechanism 483 may be positioned between the first side 422 and first pulley half 406. For this example, the first mechanism 441 is on the side of the first pulley half 406 opposite axially from the sheave 418 and gap 452, with respect to the central axis 416.

The second mechanism 483 may be lock nut mechanism that uses a fastener and threading about a shaft to lock a pulley half into a position. The fastener of the second mechanism 483 may be comprised of a nut 484 and a washer 486. The nut 484 and the washer 486 may be located about the shaft 404. The nut 484 and washer 486 may be ring like in shape and circumferentially surround the shaft 404. For one example the nut 484 may be positioned axially between the first side 422 and first pulley half 406, with respect to the central axis 416. The washer 486 may be positioned axially between the nut 484 and the first pulley half 406, with respect to the central axis 416.

The nut 484 may be threading coupled (fastened) to the shaft 404 via a threading 488 of the second mechanism 483. The nut 484 may have a threading complementary to the threading 488. The threading 488 may be located about the shaft 404, wherein the shaft 404 and the central axis 416 may be approximately concentric to the threading 488.

For the second embodiment 482, a spacer 490 may be located between the first and second pulley halves 406, 408 enclosed by gap 452. The spacer 490 may be located radially closer to the central axis 416 than the alignment dowel 458, first hole 460a, and second hole 460b. The spacer 490 may be of a length 492. When the spacer 490 is inserted in gap 452, the length 492 may be axial with respect to the central axis 416. There may be at least a single spacer 490 enclosed by gap 452 when the pulley 402 is assembled on and about the shaft 404. For other examples there may be a plurality of spacers 490 enclosed by gap 452 positioned radially, with respect to the central axis 416, about the shaft 404.

There may be a plurality of embodiments of spacer 490 with different dimensions, such as length 492. The aforementioned embodiments of spacer 490 may be specific to a position, such as first or second position 401, 429. For example, a first embodiment of the spacer 490 may be used for the second position 429. For this example, the length 492 may be approximately the same as second distance 456. For another example, a second embodiment of the spacer 490 may be used for the first position 401. For this example, the length 492 may be approximately the same as first distance 454.

The nut 484 and washer 486 may be used to adjust the first pulley half 406 along a shaft with respect to the central axis 416. For example, the nut 484 may be threaded with threading 488. The nut 484 may be rotated about the shaft in a first direction, such as a clockwise or counter clockwise direction, to tighten the nut 484. As the nut 484 is tightened, the nut 484 may be torqued and the washer 486 may be translated axially toward the second side 424, with respect to the central axis 416. The first pulley half 406 may be pressed by the washer 486 and translated approximately axially toward the second side 424, with respect to central axis 416. The spacer 490 may abut and prevent translation of the first pulley half 406 toward the second side 424. The spacer 490 may therein prevent the nut 484 from being over tightened and the gap 452 from being shortened below the distance for a position complementary to the spacer 490.

For another example, the nut 484 may be threaded with threading 488. The nut 484 may be rotated about the shaft in a second direction opposite to the first direction to loosen the nut 484. As the nut 484 is loosened, the nut 484 may be torqued toward the first side 422. As the nut 484 is torqued toward the first side 422 a distance axial to the central axis 416 may be created between the nut 484 and washer 486. The washer 486 and first pulley half 406 may then be translated toward the first side 422 via a force axial to the central axis 416 in the direction of the first side 422.

As illustrated in FIGS. 4A-D, the same gearbox, with the same housing and same components, can be manufactured to have different gear ratios. In this way, a line of transmissions may be provided where different gear ratios are offered via adjustment of the effective pulley diameter as illustrated and described. Each of the gearboxes in the line may have different axial positions of the top pulley, for example, with all remaining elements being the same and positioned/coupled in the same way.

A set of reference axes 503 are provided for comparison between views shown in FIGS. 5-6. The reference axes 503 indicate a y-axis, an x-axis, and a z-axis. In one example, the z-axis may be parallel with a direction of gravity and the x-y plane may be parallel with a horizontal plane that a gear assembly 502 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 5, it shows a first side view 500 of a gear assembly 502. Gear assembly 502 may have a first side 504 and a second side 506. For an example, in first side view 500, the first side 504 may be located in the negative y direction relative to the gear assembly 502. For this example, in the first side view 500, the second side 506 may be located in the positive y direction relative to the gear assembly 502.

The gear assembly 502 may therein be formed of components and features shown in FIGS. 2A-B. The gear assembly 502 may have a first shaft 508, a second shaft 510, and a third shaft 512 that may be embodiments of the first shaft 208, second shaft 210, and third shaft 212, respectively, with reference to in FIGS. 2A-B. The first shaft 508 may be centered on a first central axis 516, wherein the first shaft 508 may be located about and/or circumferentially surround the first central axis 516. The length of first shaft 508 may be parallel with the length of first central axis 516. Second shaft 510 may be centered on a second central axis 518, wherein the second shaft 510 may circumferentially surround the second central axis 518. The length of second shaft 510 may be parallel with the second central axis 518. Third shaft 512 may be centered on a third central axis 520, wherein the third shaft 512 may circumferentially surround the third central axis 520. The length of third shaft 512 may be parallel with the third central axis 520.

The first shaft 508 includes a spline 514 that may be used to engage and drivingly couple to another shaft or a gear. For example, the spline 514 may drivingly couple to the output of a prime mover, such as output shaft 214, with reference to FIGS. 2A-B. The spline 514 may have a plurality of teeth 514a. The teeth 514a may mesh with the complementary teeth of a shaft to drivingly couple spline 514 to the shaft.

The teeth 514a of the spline 514 may also mesh with the complementary teeth of a gear, therein drivingly coupling the spline 514 to the gear.

The gear assembly 502 may have a first pulley 524 and a second pulley 526 about the first and second shafts 508, 510, respectively. The first pulley 524 and second pulley 526 may be embodiments of the first pulley 224 and second pulley 226, respectively, with reference to FIGS. 2A-B. Likewise, the first pulley 524 and second pulley 526 may be of the first embodiment 440 or the second embodiment 482 of the pulley 402, with reference to FIGS. 4C-4D. The first and second pulleys 524, 526 may be drivingly coupled via a belt 528. Belt 528 may be an embodiment of belt 254 with reference to FIGS. 2A-B.

A first gear 532 and a second gear 534 may be located about the second and third shafts 510, 512, respectively. The first gear 532 and second gear 534 may be embodiments of the first gear 232 and second gear 234, respectively, with reference to FIGS. 2A-B. A gear support 536 may be located about the second shaft 510. The gear support 536 may circumferentially surround the second shaft 510. The gear support 536 may support and have surface sharing contact with the first gear 532. The first gear 532 may circumferentially surround gear support 536.

For one example, the second gear 534 may be drivingly coupled to the third shaft 512 via a differential 530. For this example, the second gear 534 may act as a differential gear for the differential 530. The third shaft 512 may be divided into a first half 512a and a second half 512b. The first half 512a may be located closest to the first side 504 from the second gear 534. The second half 512b may be located closest to the second side 506 from the second gear 534. The differential 530 may distribute a different RPM and torque to the first half 512a and second half 512b. The first half 512a and second half 512b may act as a first output shaft and second output shaft, respectively.

The differential 530 may be enclosed by a housing 538. The housing 538 may enclose or partially enclose a plurality of gears, such as sun gears or bevel gears that are part of differential 530. The housing 538 may be coupled to the second gear 534. For an example of one embodiment, housing 538 may be coupled to a surface or plurality of surfaces perpendicular to and extending radially from the third central axis 520. The surfaces may be a separate component from the second gear 534, such as a plate (plate 622 in FIG. 6). A single or a plurality of plates may be fastened to the second gear 534 via a plurality of fasteners 540.

A first bearing assembly 542 and a second bearing assembly 544 may be located about and be supported by the second shaft 510. The second bearing assembly 544 may be located about and circumferentially surround the gear support 536. The first and second bearing assemblies 542, 544 may support and allow the second shaft 510 to spin about the second central axis 518. A third bearing assembly 546 and a fourth bearing assembly 548 may be located about and supported by the third shaft 512. The third bearing assembly 546 may be located about, support, and allow the first half 512a to spin about the third central axis 520. The fourth bearing assembly 548 may be located about, support, and allow the second half 512b to spin about the third central axis 520.

The first pulley 524 may have a first sheave 572 that may be an embodiment of the first sheave 256, with reference to FIGS. 2A-B. The second pulley 526 may have a second sheave 574 that may be an embodiment of the second sheave 258, with reference to FIGS. 2A-B.

The first pulley 524 may be formed from two halves, the halves including a first variator 550 and a second variator 552. The first and second variators 550, 552 may be embodiments of the first and second variators 310, 312, respectively, with reference to FIGS. 3A-B. The first and second variators 550, 552 may form the first sheave 572. Similarly, the second pulley 526 may be formed from two halves, the halves including a third variator 554 and a fourth variator 556. The third and fourth variators 554, 556 may be embodiments of the third and fourth variators 314, 316, respectively, with reference to FIGS. 3A-B. The third and fourth variators 554, 556 may form the second sheave 574. For example, the first and third variators 550, 554 may be embodiments of the first pulley half 406, with reference to FIGS. 4A-4D. For this example, the second and fourth variators 552, 556 may be embodiments of the second pulley half 408, with reference to FIGS. 4A-4D. For another example, the first and third variators 550, 554 may be embodiments of the second pulley half 408, with reference to FIGS. 4A-4D. For this example, the second and fourth variators 552, 556 may be embodiments of the first pulley half 406, with reference to FIGS. 4A-4D.

The first gear 532 may have a plurality of first teeth 562. The first teeth 562 may be referred to herein as first gear teeth 562. The second gear 534 may have a plurality of second teeth 564. The second teeth 564 may be referred to herein as second gear teeth 564. The first gear teeth 562 may be complimentary to and may intermesh with the second gear teeth 564. When the first gear teeth 562 mesh with the second gear teeth 564, the first gear 532 may be drivingly coupled to the second gear 534.

Components and features described above that may be embodiments of components and features of FIGS. 2A-4D, may function the same or similarly to as described in prior figures.

Turning to FIG. 6, it shows a second side view 602 of gear assembly 502. The second side view 602 is perpendicular to the first central axis 516, second central axis 518, and third central axis 520. The second side view 602 shows gear assembly 502 may have a third side 604 and a fourth side 606. For an example, in view 602, the third side 604 may be located in the positive x direction and the fourth side 606 may be located in the negative x direction relative to the gear assembly 502.

The second side view 602 shows a plate 622 that may be fastened to the second gear 534 via fasteners 540. The plate 622 may partially enclose and protect the components and features enclosed by housing 538 from degradation.

The second side view 602 shows the second bearing assembly 544 may be formed of a first outer ring 626 and a first inner ring 630. Between the first outer ring 626 and first inner ring 630 may be plurality of first bearings 628. The first bearings 628 may be located radially about the first inner ring 630 with respect to the second central axis 518. Likewise, the fourth bearing assembly 548 may be formed of a second outer ring 632 and a second inner ring 636. Between the second outer ring 632 and second inner ring 636 may be plurality of second bearings 634. The second bearings 634 may be located radially about the second inner ring 636 with respect to the third central axis 520. The first bearings 628 and second bearings 634 of view 602 may be ball bearings. However, the type of bearing used may be non-limiting. The first and second bearings 628, 634 may be another type of bearing. Likewise, the type of bearing assembly used may be non-limiting. For example, second and fourth bearing assemblies 544, 548 may be a bearing assembly without an inner ring, such as a plain bearing.

Turning to FIG. 7, it shows an isometric view 700 of a portion of a pulley 702. The visible portion of the pulley 702 may be a pulley half 706. Pulley half 706 may be located about and supported by a shaft 704. The shaft 704 may be centered on a central axis 716, wherein the central axis 716 may be approximately concentric to shaft 704. For the isometric view 700, the central axis 716 may be parallel with the y-axis.

Pulley 702 may be an example of the second embodiment 482 of pulley 402, with reference to FIG. 4D. The pulley 702 may either first pulley 524 or second pulley 526, with reference to FIG. 5. Shaft 704 and pulley half 706 may be examples of shaft 404 and first pulley half 406, respectively, with reference to FIG. 4D. Shaft 704 may be the first shaft 508 or second shaft 510, with reference to FIG. 5.

A nut 724 and washer 726 may be located about the shaft 704. The nut 724 and washer 726 may be embodiments of nut 484 and washer 486, respectively, with reference to FIG. 4D. The washer 726 may be positioned axially, with respect to the central axis 716, between the nut 724 and a face 728 of the pulley half 706. The face 728 and washer 726 may be ring like in shape extending radially from the shaft 704, with respect to central axis 716. Likewise, portions of the nut 724 may be ring like in shape and extend radially from the shaft 704, with respect to central axis 716.

The nut 724 may have a plurality of recesses 732 that form a radial pattern about the nut 724 with respect to the central axis 716. The recesses 732 may act as points of contact and/or may couple with a tool, such as a wrench, that may be used to tighten the nut 724. For the example shown in view 700, the face 728 may have a flat surface that is lateral with respect to the central axis 716. For another example, the face 728 may be slightly concave.

Thus, disclosed herein are systems and components for a belt drive that may be used in place of a gearset and act as a reduction stage for a transmission and gearbox. The belt drive may be used in a three-wheel vehicle, such as a rickshaw, or a four-wheel embodiment, such as a four-wheel cart. The belt drive may be used in a vehicle with a prime mover that is electrically or combustion driven. The belt drive may be formed of a belt and at least two pulleys. Each pulley may be formed of two halves. The two halves or pulley halves may each be or incorporate a variator. Adjusting the distance between the pulley halves may adjust the effective torque transmitting diameter of the pulley supporting the belt. For example, decreasing the distance between the pulley halves may increase effective torque transmitting diameter of the pulley available to the belt. For another example, increasing the distance between the pulley halves may decrease the effective torque transmitting diameter of the pulley available to the belt. Changing the effective torque transmitting diameter of the pulley available to the belt may change the ratio of the belt drive, wherein increasing the effective torque transmitting diameter of the pulley may increase the ratio and decreasing the effective torque transmitting diameter of the pulley may decrease the ratio. The ratio of the belt drive may be adjustable during assembly and/or disassembly of the gearbox, such as during manufacturing of the gearbox. The different positions and fixed ratios for the belt drive may allow for more interchangeable parts, such as the belts and pulleys, to be used between similarly sized gearboxes with different ratio requirements. Less machining may be used in production of pulleys and there may be less variation in the dimensions of pulleys used for belt drive. The quantity of materials and waste generated from the machining and/or manufacturing the belt drive may be reduced. The types and quantities of tools used for machining and/or manufacturing the belt drive, may be reduced. The belt of the belt drive may be a dry belt that may not be lubricated when the gearbox is operating. The belt drive may reduce the quantity of oil used in the gearbox by replacing a reduction stage, such as a gearset, that may be lubricated during operations.

The disclosure also provides support for a line of transmissions, comprising: a first multi-stage reduction gearbox including a first stage having a variable ratio belt drive with a first fixed ratio, and a second stage having fixed gears, and a second multi-stage reduction gearbox including a first stage having the same variable ratio belt drive as the first multi-stage reduction gearbox but with a second fixed ratio different from the first, and a second stage having the same fixed gears as the second stage of the first multi-stage reduction gearbox. In a first example of the system, the first stage is formed of two parallel axis pulleys. In a second example of the system, optionally including the first example, each pulley is formed from two halves, wherein each half is a variator or has a variator component. In a third example of the system, optionally including one or both of the first and second examples, each pulley half is locked in place via a mechanical lock. In a fourth example of the system, optionally including one or more or each of the first through third examples, the mechanical lock includes a fastener formed by nut and washer, wherein the nut has a threading that is complimentary to and threaded with a threading on a shaft supporting each pulley. In a fifth example of the system, optionally including one or more or each of the first through fourth examples, the mechanical lock is positioned about a shaft supporting each pulley and on a side of a pulley half opposite from a gap between two halves of each pulley. In a sixth example of the system, optionally including one or more or each of the first through fifth examples, the variable ratio belt drive with the first fixed ratio is a dry belt. In a seventh example of the system, optionally including one or more or each of the first through sixth examples, a housing of the first multi-stage reduction gearbox is the same as a housing of the second multi-stage reduction gearbox. In a eighth example of the system, optionally including one or more or each of the first through seventh examples, the first multi-stage reduction gearbox is configured to be coupled to a first electric motor and the second multi-stage reduction gearbox is configured to be coupled to a second electric motor having a different torque range or speed range than the first electric motor. In a ninth example of the system, optionally including one or more or each of the first through eighth examples, the first multi-stage reduction gearbox further comprises a differential coupled to the second stage. The disclosure also provides support for a system, comprising: a multi-stage reduction gearbox, having a first stage having a manually variable ratio belt drive that is locked to a first fixed ratio, and a second stage having fixed helical gears, and a differential coupled to an output of the second stage. In a first example of the system, the multi-stage reduction gearbox includes a first axis, a second axis, and a third axis, all parallel to one another, the first stage traversing the first axis to the second axis, and the second stage traversing the second axis to the third axis, the differential positioned on the third axis and having a first output shaft and a second output shaft on a first side and second side of the third axis. In a second example of the system, optionally including the first example, the system further comprises: an electric motor coupled to the manually variable ratio belt drive via an input on the first axis. In a third example of the system, optionally including one or both of the first and second examples, the first fixed ratio is locked via a pin, that may be translated through to be partially enclosed by a hole in a pulley half and expanded to abut the surfaces of the hole. In a fourth example of the system, optionally including one or more or each of the first through third examples, the pin is positioned to extend perpendicular to or radially from an axis concentric to a shaft that supports a pulley, located on a side of a pulley half opposite from a gap between two halves of the pulley, and be partially enclosed by the hole in the shaft and a hole in the pulley half when locking the first fixed ratio.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A line of transmissions, comprising:
   a first multi-stage reduction gearbox including a first stage having a variable ratio belt drive with a first fixed ratio, and a second stage having fixed gears; and
   a second multi-stage reduction gearbox including a first stage having the same variable ratio belt drive as the first multi-stage reduction gearbox but with a second fixed ratio different from the first, and a second stage having the same fixed gears as the second stage of the first multi-stage reduction gearbox.

2. The line of transmissions of claim 1, wherein the first stage is formed of two parallel axis pulleys.

3. The line of transmissions of claim 2, wherein each pulley is formed from two halves, wherein each half is a variator or has a variator component.

4. The line of transmissions of claim 2, wherein each pulley half is locked in place via a mechanical lock.

5. The line of transmissions of claim 4, wherein the mechanical lock includes a fastener formed by nut and washer, wherein the nut has a threading that is complimentary to and threaded with a threading on a shaft supporting each pulley.

6. The line of transmissions of claim 4, wherein the mechanical lock is positioned about a shaft supporting each pulley and on a side of a pulley half opposite from a gap between two halves of each pulley.

7. The line of transmissions of claim 1, wherein the variable ratio belt drive with the first fixed ratio is a dry belt.

8. The line of transmissions of claim 1, wherein a housing of the first multi-stage reduction gearbox is the same as a housing of the second multi-stage reduction gearbox.

9. The line of transmissions of claim 1, wherein the first multi-stage reduction gearbox is configured to be coupled to a first electric motor and the second multi-stage reduction gearbox is configured to be coupled to a second electric motor having a different torque range or speed range than the first electric motor.

10. The line of transmissions of claim 1, wherein the first multi-stage reduction gearbox further comprises a differential coupled to the second stage.

11. The line of transmissions of claim 2, wherein one of the pulleys is positionable in a plurality of different axial positions.

12. The line of transmissions of claim 2, wherein one of the pulleys is positionable in a plurality of different axial positions and the other pulley is not.

13. The line of transmissions of claim 12, wherein an input to the first stage of each of the first multi-stage reduction gearbox and the second multi-stage reduction gearbox includes an electric motor.

14. The line of transmissions of claim 13, wherein a second input of each of the first multi-stage reduction gearbox and the second multi-stage reduction gearbox includes a clutch, the second input downstream of the electric motor.

15. A system, comprising:
   a multi-stage reduction gearbox, having a first stage having a manually variable ratio belt drive that is locked to a first fixed ratio; and a second stage having fixed helical gears, and a differential coupled to an output of the second stage.

16. The system of claim 15, wherein the multi-stage reduction gearbox includes a first axis, a second axis, and a third axis, all parallel to one another, the first stage traversing the first axis to the second axis, and the second stage traversing the second axis to the third axis, the differential positioned on the third axis and having a first output shaft and a second output shaft on a first side and second side of the third axis.

17. The system of claim 16, further comprising an electric motor coupled to the manually variable ratio belt drive via an input on the first axis.

18. The system of claim 17, wherein the first fixed ratio is locked via a pin, that may be translated through to be partially enclosed by a hole in a pulley half and expanded to abut surfaces of the hole.

19. The system of claim 18, wherein the pin is positioned to extend perpendicular to or radially from an axis concentric to a shaft that supports a pulley; located on a side of a pulley half opposite from a gap between two halves of the pulley; and be partially enclosed by the hole in the shaft and a hole in the pulley half when locking the first fixed ratio.

* * * * *